US009741209B2

(12) United States Patent
Aoki

(10) Patent No.: US 9,741,209 B2
(45) Date of Patent: Aug. 22, 2017

(54) SYSTEMS, METHODS, AND DEVICES FOR PLAYING PROGRESSIVE WAGERING GAMES WITH AWARD-BASED INCREMENTING FEATURES

(75) Inventor: Dion K. Aoki, Chicago, IL (US)

(73) Assignee: Bally Gaming, Inc., Las Vegas, NV (US)

( * ) Notice: Subject to any disclaimer, the term of this patent is extended or adjusted under 35 U.S.C. 154(b) by 1026 days.

(21) Appl. No.: 13/430,993

(22) Filed: Mar. 27, 2012

(65) Prior Publication Data

US 2012/0252562 A1 Oct. 4, 2012

Related U.S. Application Data

(60) Provisional application No. 61/471,274, filed on Apr. 4, 2011.

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***G07F 17/34*** | (2006.01) |
| ***G07F 17/32*** | (2006.01) |

(52) U.S. Cl.

CPC .......... *G07F 17/34* (2013.01); *G07F 17/3258* (2013.01)

(58) Field of Classification Search

CPC ............................. G07F 17/34; G07F 17/3258
USPC ...................................................... 463/20, 25
See application file for complete search history.

(56) References Cited

U.S. PATENT DOCUMENTS

| | | | |
|---|---|---|---|
| 5,779,544 | A | 7/1998 | Seelig et al. |
| 5,885,158 | A | 3/1999 | Torango et al. |

(Continued)

FOREIGN PATENT DOCUMENTS

| | | | |
|---|---|---|---|
| EP | 1 513 114 | A2 | 3/2005 |
| EP | 1 564 698 | A2 | 8/2005 |

(Continued)

OTHER PUBLICATIONS

Third Party Submission dated Oct. 18, 2011, 3 pages.

(Continued)

*Primary Examiner* — Omkar Deodhar
*Assistant Examiner* — Wei Lee
(74) *Attorney, Agent, or Firm* — Nixon Peabody LLP

(57) ABSTRACT

Gaming devices, gaming systems, methods of conducting a wagering game, and computer programs for executing a wagering game are presented herein. A gaming system for conducting a wagering game is disclosed, which includes an input device for receiving wagers, a display for displaying the wagering game, and a controller. The controller is configured to: determine whether one or more progressive jackpots are active, each jackpot having a respective progressive value and a respective trigger value; randomly determine an outcome of the base game; determine if the base-game outcome has an award associated therewith; if one or more progressive jackpots are active and the base-game outcome has an award associated therewith, provide the award to the player and increment the progressive value for each active jackpot by at least the base-game award; and, if the incremented value of an active progressive jackpot is equal to or greater than its respective trigger value, award the incremented value to the player.

25 Claims, 11 Drawing Sheets

(56) References Cited

U.S. PATENT DOCUMENTS

| | | | |
|---|---|---|---|
| 5,997,400 | A | 12/1999 | Seelig et al. |
| 6,168,523 | B1 | 1/2001 | Piechowiak et al. |
| 6,364,314 | B1 | 4/2002 | Canterbury |
| 6,435,968 | B1 | 8/2002 | Torango |
| 6,523,124 | B1 | 2/2003 | Lunsford et al. |
| 6,796,904 | B2 | 9/2004 | Yoseloff |
| 6,890,259 | B2 | 5/2005 | Breckner et al. |
| 7,077,746 | B2 | 7/2006 | Torango |
| 7,614,948 | B2 | 11/2009 | Saffari et al. |
| 7,753,775 | B2 | 7/2010 | Yoshizawa |
| 7,850,524 | B2 | 12/2010 | Jackson |
| 7,980,947 | B2 | 7/2011 | Michaelson et al. |
| 7,997,580 | B2 * | 8/2011 | Luciano, Jr. .................. 273/139 |
| 2002/0163778 | A1 | 11/2002 | Hazzard et al. |
| 2002/0183105 | A1 | 12/2002 | Cannon et al. |
| 2003/0003989 | A1 | 1/2003 | Johnson |
| 2003/0032475 | A1 | 2/2003 | Yoseloff |
| 2003/0064805 | A1 | 4/2003 | Wells |
| 2003/0069056 | A1 | 4/2003 | Cormack et al. |
| 2003/0114220 | A1 | 6/2003 | McClintic |
| 2003/0119581 | A1 | 6/2003 | Cannon et al. |
| 2003/0162585 | A1 * | 8/2003 | Bigelow et al. ................ 463/20 |
| 2003/0207705 | A1 | 11/2003 | Falciglia |
| 2004/0092315 | A1 | 5/2004 | Boyd et al. |
| 2004/0152511 | A1 | 8/2004 | Nicely et al. |
| 2004/0235553 | A1 | 11/2004 | Iwamoto |
| 2005/0003886 | A1 * | 1/2005 | Englman et al. ............... 463/25 |
| 2005/0020340 | A1 | 1/2005 | Cannon |
| 2005/0059467 | A1 * | 3/2005 | Saffari et al. ................... 463/19 |
| 2005/0064932 | A1 | 3/2005 | Cannon |
| 2005/0239542 | A1 * | 10/2005 | Olsen .............................. 463/27 |
| 2006/0019750 | A1 * | 1/2006 | Beatty ............................. 463/42 |
| 2006/0046820 | A1 | 3/2006 | Inamura |
| 2006/0223611 | A1 | 10/2006 | Baerlocher et al. |
| 2006/0247006 | A1 | 11/2006 | Inamura |
| 2007/0060314 | A1 * | 3/2007 | Baerlocher et al. ............ 463/25 |
| 2007/0202944 | A1 | 8/2007 | Oomori |
| 2008/0076514 | A1 * | 3/2008 | Baerlocher et al. ............ 463/20 |
| 2008/0139285 | A1 * | 6/2008 | Zimmermann ................. 463/20 |
| 2008/0254869 | A1 | 10/2008 | Fujimoto et al. |
| 2009/0170593 | A1 | 7/2009 | Pacey |
| 2009/0247302 | A1 | 10/2009 | Kelly et al. |
| 2009/0264191 | A1 | 10/2009 | Roukis et al. |
| 2009/0298595 | A1 | 12/2009 | Okuaki |
| 2009/0305776 | A1 | 12/2009 | Englman et al. |
| 2009/0325670 | A1 | 12/2009 | Kelly et al. |
| 2010/0029363 | A1 | 2/2010 | Hoffman et al. |
| 2010/0029367 | A1 | 2/2010 | Englman et al. |
| 2010/0041459 | A1 | 2/2010 | Saffari et al. |
| 2010/0041464 | A1 | 2/2010 | Arezina et al. |
| 2010/0062841 | A1 | 3/2010 | Englman et al. |
| 2010/0087245 | A1 | 4/2010 | Johnson |
| 2010/0093420 | A1 | 4/2010 | Wright et al. |
| 2010/0137047 | A1 | 6/2010 | Englman et al. |
| 2010/0197386 | A1 | 8/2010 | Lafky et al. |
| 2010/0222137 | A1 | 9/2010 | Goto et al. |
| 2010/0261521 | A1 | 10/2010 | Oatman et al. |
| 2010/0331071 | A1 | 12/2010 | Uchiyama et al. |
| 2011/0111826 | A1 * | 5/2011 | Baerlocher et al. ............ 463/20 |

FOREIGN PATENT DOCUMENTS

| | | | |
|---|---|---|---|
| EP | 1 762 990 | A2 | 3/2007 |
| GB | 2 135 490 | | 2/1983 |
| WO | 2006 015442 | A1 | 2/2006 |
| WO | 2007-094250 | A1 | 8/2007 |
| WO | 2008060429 | | 5/2008 |
| WO | 2008060442 | | 5/2008 |

OTHER PUBLICATIONS

"Principles for the Functionality of Gaming Machine Monitoring and Control Systems." Australian government, 16 pages, Nov. 4, 2010. <http://www.olgr.qld.gov.au/resources/gamDocs/mon_sys/principlesForFunctionalityOfGamingMachineMonitoringAndControlSystemsVer2.pdf> Accessed Dec. 1, 2010.

International Search Report of PCT/US2006/34734; 3 pages; mailed Jun. 1, 2007.

International Search Report of PCT/US2008/005032; 4 pages; mailed Aug. 11, 2008.

Written Opinion of PCT/US2008/005032; 6 pages; mailed Aug. 11, 2008.

* cited by examiner

SYSTEMS, METHODS, AND DEVICES FOR PLAYING PROGRESSIVE WAGERING GAMES WITH AWARD-BASED INCREMENTING FEATURES

CROSS-REFERENCE AND CLAIM OF PRIORITY TO RELATED APPLICATION

This application claims the benefit of and priority to U.S. Provisional Patent Application No. 61/471,274, which was filed on Apr. 4, 2011, and is incorporated herein by reference in its entirety.

COPYRIGHT

A portion of the disclosure of this patent document contains materials which is subject to copyright protection. The copyright owner has no objection to the facsimile reproduction by anyone of the patent disclosure, as it appears in the Patent and Trademark Office patent files or records, but otherwise reserves all copyright rights whatsoever.

TECHNICAL FIELD

The present disclosure relates generally to wagering games, as well as systems and devices for playing wagering games. More particularly, the present disclosure relates to systems, methods, and devices for playing progressive wagering games.

BACKGROUND

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators strive to employ the most entertaining and exciting machines, features, and enhancements available because such machines attract frequent play and hence increase profitability to the operator.

One concept that has been successfully employed to enhance the entertainment value of a game is that of a "secondary" or "bonus" game which may be played in conjunction with a "basic" game. The bonus game, which is typically entered upon the occurrence of a selected event or outcome of the basic game, may comprise any type of game, either similar to or completely different from the basic game. Such a bonus game produces a significantly higher level of player excitement than the basic game because it provides a greater expectation of winning than the basic game.

Another concept that has been employed to enhance player entertainment and achieve player loyalty is the use of progressive games. In the gaming industry, a "progressive" game historically involves collecting coin-in data from participating gaming device(s) (e.g., slot machines), contributing a percentage of that coin-in data to a progressive jackpot amount, and awarding that jackpot amount to a player upon the occurrence of a certain jackpot-won event. A jackpot-won event typically occurs when a "progressive winning position" is achieved at a participating gaming device. If the gaming device is a slot machine, a progressive winning position normally corresponds to alignment of progressive jackpot reel symbols along a certain payline. The initial progressive jackpot is a predetermined minimum amount. That jackpot amount, however, progressively increases as players continue to play the gaming machine without winning the jackpot. Further, when several gaming machines are linked together such that several players at several gaming machines compete for the same jackpot, the jackpot progressively increases at a much faster rate, which leads to further player excitement. Typically, once the progressive jackpot is awarded, the jackpot amount is reset to the predetermined minimum amount.

In existing progressive games, there may be a single progressive jackpot or multiple progressive jackpots that may be awarded. Each progressive jackpot is typically awarded upon the occurrence of a single, qualifying jackpot-won event (e.g., a predetermined symbol combination on an active payline of the base game). Moreover, the progressive jackpot will typically continue to grow, without restriction, based on coin-in contributions until the progressive-winning symbol combination is achieved. In addition, the probability of achieving the qualifying jackpot-won event and, thus, winning a particular progressive jackpot is typically fixed prior to initiation of the wagering game, and remains fixed throughout game play. While some progressive game features provide some enhanced excitement, there is a continuing need to develop new features for progressive games to satisfy the demands of players and operators. Such new features for progressive games will further enhance player excitement, perpetuate player loyalty, and thus increase game play.

SUMMARY

According to aspects of the present disclosure, a gaming system is presented for conducting a wagering game, which includes a base game and one or more progressive jackpots. The gaming system includes an input device for receiving a wager to play the wagering game, and a display for displaying outcomes of the wagering game. The gaming system also includes at least one memory device that stores a plurality of instructions which, when executed by at least one processor, cause the at least one processor to operate with the display to: determine whether at least one of the one or more progressive jackpots is active, the one or more progressive jackpots each having a respective progressive value and a respective trigger value; determine an outcome of the base game, the base-game outcome being randomly determined from a plurality of base-game outcomes; determine if the base-game outcome has a base-game award associated therewith; responsive to the at least one of the one or more progressive jackpots being active and the base-game outcome having a base-game award associated therewith, award the base-game award to the player and increment the respective progressive value of the active at least one progressive jackpot by an increment amount equal to at least the base-game award; and, responsive to the incremented respective progressive value of the active at least one progressive jackpot being equal to or greater than the respective trigger value, award the incremented respective progressive value to the player.

According to other aspects of the present disclosure, a gaming system for conducting a wagering game is presented. The gaming system includes at least one input device, at least one display device, at least one processor, and at least one memory device. The at least one memory device stores a plurality of instructions which, when executed by the at least one processor, cause the at least one processor to operate with the at least one display device and the least one input device to conduct a wagering game, which includes: receiving a wager to play the wagering game; determining an outcome of a first instance of the wagering game, the outcome being randomly determined from a plurality of wagering-game outcomes; determining if the first-instance outcome has an award associated therewith; determining whether one or more progressive jackpots associated with the wagering game are active, the one or more progressive jackpots each having a respective incrementing progressive value and a respective trigger value, which is selected from a respective range of trigger values; responsive to the one or more progressive jackpots not being active and the first-instance outcome having an award associated therewith, award the award to the player and end the first instance of the wagering game; responsive to the one or more progressive jackpots being active and the first-instance outcome not having an award associated therewith, end the first instance of the wagering game without awarding to the player the award or the one or more progressive jackpots; responsive to the one or more progressive jackpots being active and the first-instance outcome having an award associated therewith, award the award to the player and increment the respective progressive value of the active one or more progressive jackpots by an increment amount corresponding to the award; and, responsive to the incremented respective progressive value of at least one of the active one or more progressive jackpots being equal to or greater than the respective trigger value, award the at least one of the incremented respective progressive values to the player.

According to further aspects of the present disclosure, a computer-implemented method of conducting a wagering game on a gaming device is featured. The method includes: receiving a wager via one or more input devices; determining, via one or more processors, an outcome of a first instance of the wagering game, the outcome being randomly determined from a plurality of wagering-game outcomes; displaying, via one or more display devices, the first-instance outcome; determining if the first-instance outcome has an award associated therewith; determining whether one or more progressive jackpots associated with the wagering game are active, the one or more progressive jackpots each having a respective incrementing progressive value and a respective trigger value; responsive to the one or more progressive jackpots being active and the first-instance outcome having an award associated therewith, awarding the award to the player and incrementing the respective progressive value of the active one or more progressive jackpots by an increment amount equal to at least the award; and responsive to the incremented respective progressive value of at least one of the active one or more progressive jackpots being equal to or greater than the respective trigger value, awarding the at least one of the incremented respective progressive values to the player.

According to other aspects of the present disclosure, a gaming system for conducting a wagering game is featured. The gaming system includes an input device configured to receive a wager to play the wagering game; a display configured to display outcomes of the wagering game; and a controller configured to: determine whether at least one of the one or more progressive jackpots is active, the one or more progressive jackpots each having a respective incrementing progressive value; determine an outcome of the base game, the base-game outcome being randomly determined from a plurality of base-game outcomes; determine if the base-game outcome has a base-game award associated therewith; responsive to the at least one of the one or more progressive jackpots being active and the base-game outcome having a base-game award associated therewith, award the base-game award to the player and increment the respective progressive value of the active at least one progressive jackpot by an increment amount equal to at least the base-game award; and, responsive to a triggering event, award the incremented respective progressive value to the player.

According to even yet another aspect of the present disclosure, one or more non-transient computer readable storage media are encoded with instructions for directing a gaming device or a gaming system to perform any of the methods disclosed herein.

The above summary is not intended to represent each embodiment or every aspect of the present disclosure. Rather, the summary merely provides an exemplification of some of the novel features presented herein. The above features and advantages, and other features and advantages of the present disclosure, will be readily apparent from the following detailed description of exemplary embodiments and modes for carrying out the present invention when taken in connection with the accompanying drawings and the appended claims.

Figure 1:
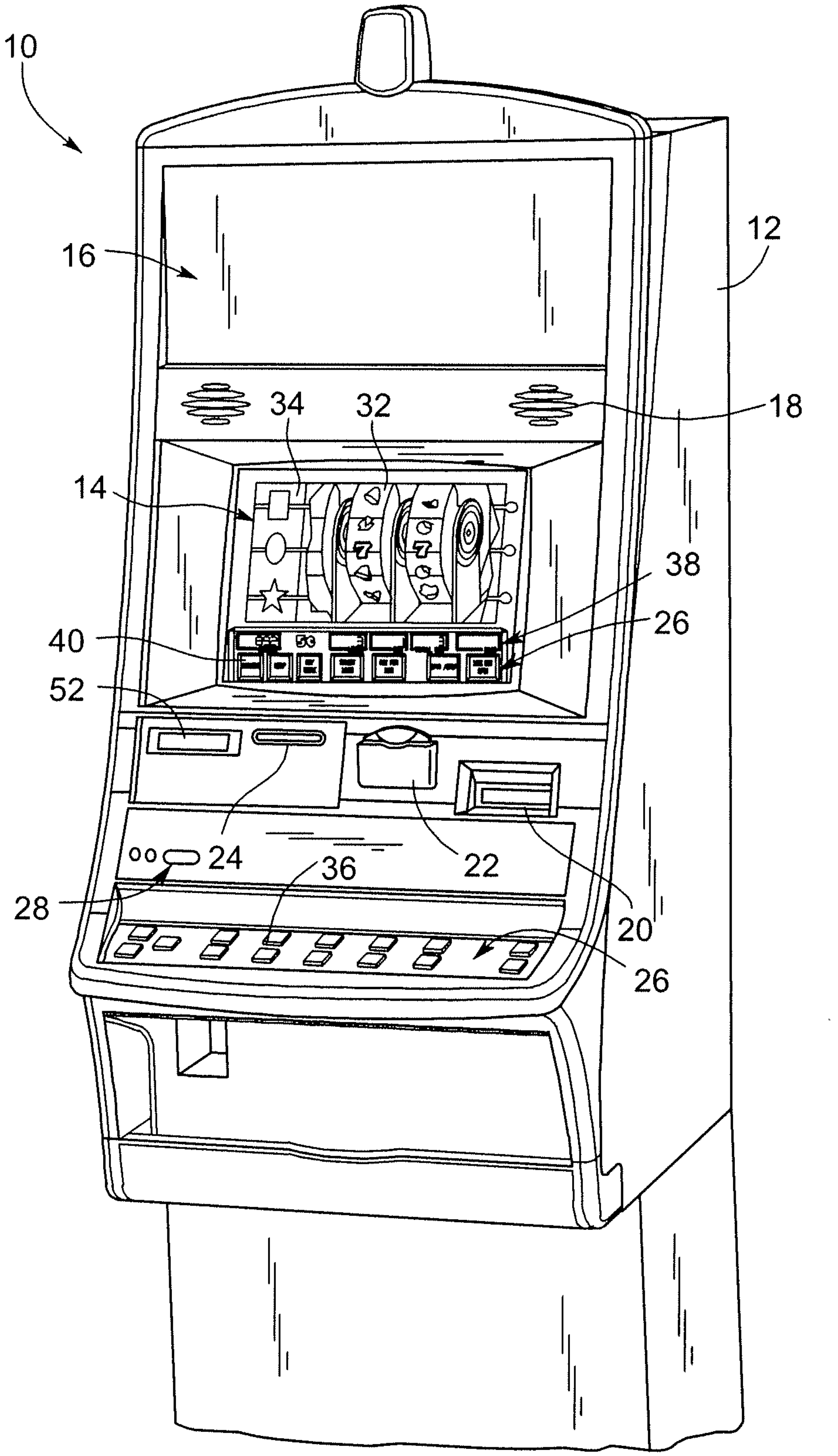
FIG. 1 is a perspective-view illustration of an exemplary free-standing gaming terminal according to aspects of the present disclosure.

While the aspects of this disclosure are susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there are shown in the drawings and will herein be described in detail representative embodiments with the understanding that the present disclosure is to be considered as an exemplification of the various aspects and principles of the invention, and is not intended to limit the broad aspect of the invention to the embodiments illustrated. To that extent, elements and limitations that are disclosed, for example, in the Abstract, Summary, and Detailed Description of the Embodiments sections, but not explicitly set forth in the claims, should not be incorporated into the claims, singly or collectively, by implication, inference or otherwise. For purposes of the present detailed description, unless specifically disclaimed: the singular includes the plural and vice versa; the words "and" and "or" shall be both conjunctive and disjunctive; the word "all" means "any and all"; the word "any" means "any and all"; and the word "including" means "including without limitation." Moreover, words of approximation, such as "about," "almost," "substantially," "approximately," and the like, can be used herein in the sense of "at, near, or nearly at," or "within 3-5% of," or "within acceptable manufacturing tolerances," or any logical combination thereof, for example.

Referring to FIG. 1, there is shown a gaming terminal 10 similar to those used in gaming establishments, such as casinos. With regard to the present disclosure, the gaming terminal 10 may be any type of gaming terminal and may have varying structures and methods of operation. For example, in some aspects, the gaming terminal 10 is be an electromechanical gaming terminal configured to play mechanical slots, whereas in other aspects, the gaming terminal is an electronic gaming terminal configured to play a video casino game, such as slots, keno, poker, blackjack, roulette, craps, etc. It should be understood that although the gaming terminal 10 is shown as a free-standing terminal of the upright type, the gaming terminal is readily amenable to implementation in a wide variety of other forms such as a free-standing terminal of the slant-top type, a portable or handheld device primarily used for gaming, such as is disclosed by way of example in PCT Patent Application No. PCT/US2007/000792 filed Jan. 11, 2007, titled "Handheld Device for Wagering Games," which is incorporated herein by reference in its entirety, a mobile telecommunications device such as a mobile telephone or personal digital assistant (PDA), a counter-top or bar-top gaming terminal, or other personal electronic device, such as a portable television, MP3 player, entertainment device, etcetera.

The gaming terminal 10 illustrated in FIG. 1 comprises a cabinet or housing 12. For output devices, this embodiment of the gaming terminal 10 includes a primary display area 14, a secondary display area 16, and one or more audio speakers 18. The primary display area 14 and/or secondary display area 16 variously displays information associated with wagering games, non-wagering games, community games, progressives, advertisements, services, premium entertainment, text messaging, emails, alerts or announcements, broadcast information, subscription information, etc. appropriate to the particular mode(s) of operation of the gaming terminal. For input devices, the gaming terminal 10 illustrated in FIG. 1 includes a bill validator 20, a coin acceptor 22, one or more information readers 24, one or more player-input devices 26, and one or more player-accessible ports 28 (e.g., an audio output jack for headphones, a video headset jack, a wireless transmitter/receiver, etc.). While these typical components found in the gaming terminal 10 are described below, it should be understood that numerous other peripheral devices and other elements exist and are readily utilizable in any number of combinations to create various forms of a gaming terminal in accord with the present concepts.

The primary display area 14 include, in various aspects of the present concepts, a mechanical-reel display, a video display, or a combination thereof in which a transmissive video display is disposed in front of the mechanical-reel display to portray a video image in superposition over the mechanical-reel display. Further information concerning the latter construction is disclosed in U.S. Pat. No. 6,517,433 to Loose et al. entitled "Reel Spinning Slot Machine With Superimposed Video Image," which is incorporated herein by reference in its entirety. The video display is, in various embodiments, a cathode ray tube (CRT), a high-resolution liquid crystal display (LCD), a plasma display, a light emitting diode (LED), a DLP projection display, an electroluminescent (EL) panel, or any other type of display suitable for use in the gaming terminal 10, or other form factor, such as is shown by way of example in FIG. 1. The primary display area 14 includes, in relation to many aspects of wagering games conducted on the gaming terminal 10, one or more paylines 30 (see FIG. 3) extending along a portion of the primary display area. In the illustrated embodiment of FIG. 1, the primary display area 14 comprises a plurality of mechanical reels 32 and a video display 34, such as a transmissive display (or a reflected image arrangement in other embodiments), in front of the mechanical reels 32. If the wagering game conducted via the gaming terminal 10 relies upon the video display 34 only and not the mechanical reels 32, the mechanical reels 32 are optionally removed from the interior of the terminal and the video display 34 is advantageously of a non-transmissive type. Similarly, if the wagering game conducted via the gaming terminal 10 relies only upon the mechanical reels 32, but not the video display 34, the video display 34 depicted in FIG. 1 is replaced with a conventional glass panel. Further, in still other embodiments, the video display 34 is disposed to overlay another video display, rather than a mechanical-reel display, such that the primary display area 14 includes layered or superimposed video displays. In yet other embodiments, the mechanical-reel display of the above-noted embodiments is replaced with another mechanical or physical member or members such as, but not limited to, a mechanical wheel (e.g., a roulette game), dice, a pachinko board, or a diorama presenting a three-dimensional model of a game environment.

Video images in the primary display area 14 and/or the secondary display area 16 are rendered in two-dimensional (e.g., using Flash Macromedia™) or three-dimensional graphics (e.g., using Renderware™). In various aspects, the video images are played back (e.g., from a recording stored on the gaming terminal 10), streamed (e.g., from a gaming network), or received as a TV signal (e.g., either broadcast or via cable) and such images can take different forms, such as animated images, computer-generated images, or "real-life" images, either prerecorded (e.g., in the case of marketing/promotional material) or as live footage. The format of the video images can include any format including, but not limited to, an analog format, a standard digital format, or a high-definition (HD) digital format.

The player-input or user-input device(s) 26 include, by way of example, a plurality of buttons 36 on a button panel, as shown in FIG. 1, a mouse, a joy stick, a switch, a microphone, and/or a touch screen 38 mounted over the primary display area 14 and/or the secondary display area 16 and having one or more soft touch keys 40, as is also shown in FIG. 1. In still other aspects, the player-input devices 26 comprise technologies that do not rely upon physical contact between the player and the gaming terminal, such as speech-recognition technology, gesture-sensing technology, eye-tracking technology, etc. The player-input or user-input device(s) 26 thus accept(s) player input(s) and transforms the player input(s) to electronic data signals indicative of a player input or inputs corresponding to an enabled feature for such input(s) at a time of activation (e.g., pressing a "Max Bet" button or soft key to indicate a player's desire to place a maximum wager to play the wagering game). The input(s), once transformed into electronic data signals, are output to a CPU or controller 42 (see FIG. 2) for processing. The electronic data signals are selected from a group consisting essentially of an electrical current, an electrical voltage, an electrical charge, an optical signal, an optical element, a magnetic signal, and a magnetic element.

The information reader 24 (or information reader/writer) is preferably located on the front of the housing 12 and comprises, in at least some forms, a ticket reader, card reader, bar code scanner, wireless transceiver (e.g., RFID, Bluetooth, etc.), biometric reader, or computer-readable-storage-medium interface. As noted, the information reader may comprise a physical and/or electronic writing element to permit writing to a ticket, a card, or computer-readable-storage-medium. The information reader 24 permits information to be transmitted from a portable medium (e.g., ticket, voucher, coupon, casino card, smart card, debit card, credit card, etc.) to the information reader 24 to enable the gaming terminal 10 or associated external system to access an account associated with cashless gaming, to facilitate player tracking or game customization, to retrieve a saved-game state, to store a current-game state, to cause data transfer, and/or to facilitate access to casino services, such as is more fully disclosed, by way of example, in U.S. Patent Publication No. 2003/0045354, published on Mar. 6, 2003, entitled "Portable Data Unit for Communicating With Gaming Machine Over Wireless Link," which is incorporated herein by reference in its entirety. The noted account associated with cashless gaming is, in some aspects of the present concepts, stored at an external system 46 (see FIG. 2) as more fully disclosed in U.S. Pat. No. 6,280,328 to Holch et al. entitled "Cashless Computerized Video Game System and Method," which is incorporated herein by reference in its entirety, or is alternatively stored directly on the portable storage medium. Various security protocols or features can be used to enhance security of the portable storage medium. For example, in some aspects, the individual carrying the portable storage medium is required to enter a secondary independent authenticator (e.g., password, PIN number, biometric, etc.) to access the account stored on the portable storage medium.

Figure 2:
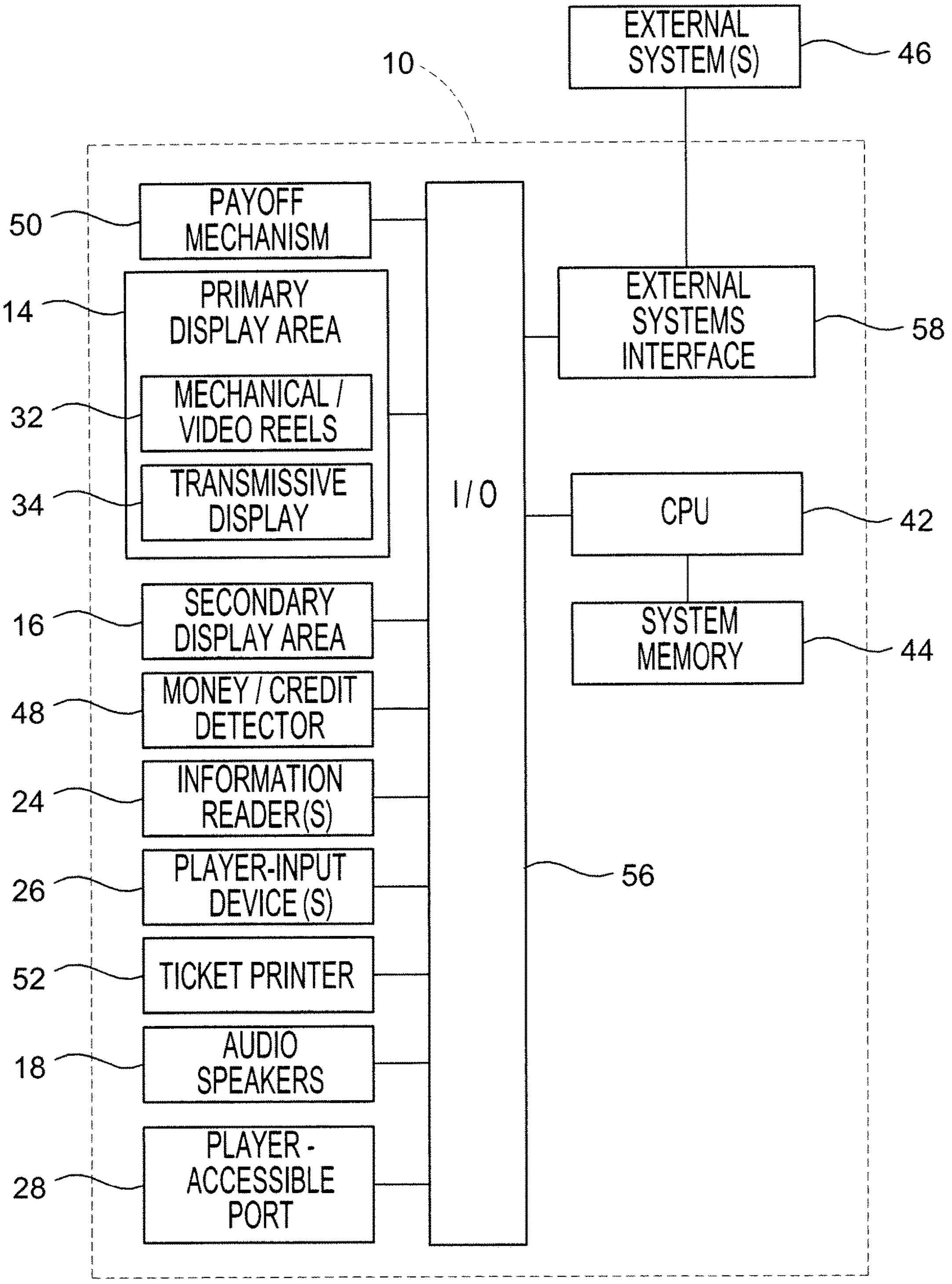
FIG. 2 is a schematic diagram of an exemplary gaming system according to embodiments of the present disclosure.

Turning now to FIG. 2, the various components of the gaming terminal 10 are controlled by one or more processors (e.g., CPU, distributed processors, etc.) 42, also referred to herein generally as a controller (e.g., microcontroller, microprocessor, etc.). The controller 42 can include any suitable processor(s), such as an Intel® Pentium processor, Intel® Core 2 Duo processor, AMD Opteron™ processor, or UltraSPARC® processor. By way of example, the controller 42 includes a plurality of microprocessors including a master processor, a slave processor, and a secondary or parallel processor. Controller 42, as used herein, comprises any combination of hardware, software, and/or firmware disposed in and/or disposed outside of the gaming terminal 10 that is configured to communicate with and/or control the transfer of data between the gaming terminal 10 and a bus, another computer, processor, or device and/or a service and/or a network. The controller 42 comprises one or more controllers or processors and such one or more controllers or processors need not be disposed proximal to one another and may be located in different devices and/or in different locations. For example, a first processor is disposed proximate a user interface device (e.g., a push button panel, a touch screen display, etc.) and a second processor is disposed remotely from the first processor, the first and second processors being electrically connected through a network. As another example, the first processor is disposed in a first enclosure (e.g., a gaming machine) and a second processor is disposed in a second enclosure (e.g., a server) separate from the first enclosure, the first and second processors being communicatively connected through a network. The controller 42 is operable to execute all of the various gaming methods and other processes disclosed herein.

To provide gaming functions, the controller 42 executes one or more game programs comprising machine-executable instructions stored in local and/or remote computer-readable data storage media (e.g., memory 44 or other suitable storage device). The term computer-readable data storage media, or "computer-readable medium," as used herein refers to any media/medium that participates in providing instructions to controller 42 for execution. The computer-readable medium comprises, in at least some exemplary forms, non-volatile media (e.g., optical disks, magnetic disks, etc.), volatile media (e.g., dynamic memory, RAM), and transmission media (e.g., coaxial cables, copper wire, fiber optics, radio frequency (RF) data communication, infrared (IR) data communication, etc). Common forms of computer-readable media include, for example, a hard disk, magnetic tape (or other magnetic medium), a 2-D or 3-D optical disc (e.g., a CD-ROM, DVD, etc.), RAM, PROM, EPROM, FLASH-EPROM, any other memory chip or solid state digital data storage device, a carrier wave, or any other medium from which a computer can read. By way of example, a plurality of storage media or devices are provided, a first storage device being disposed proximate the user interface device and a second storage device being disposed remotely from the first storage device, wherein a network is connected intermediate the first one and second one of the storage devices.

Various forms of computer-readable media may be involved in carrying one or more sequences of one or more instructions to controller 42 for execution. By way of example, the instructions may initially be borne on a data storage device of a remote device (e.g., a remote computer, server, or system). The remote device can load the instructions into its dynamic memory and send the instructions over a telephone line or other communication path using a modem or other communication device appropriate to the communication path. A modem or other communication device local to the gaming machine 10 or to an external system 46 associated with the gaming machine can receive the data on the telephone line or conveyed through the communication path (e.g., via external systems interface 58) and output the data to a bus, which transmits the data to the system memory 44 associated with the processor 42, from which system memory the processor retrieves and executes the instructions.

Thus, the controller 42 is able to send and receive data, via carrier signals, through the network(s), network link, and communication interface. The data includes, in various examples, instructions, commands, program code, player data, and game data. As to the game data, in at least some aspects of the present concepts, the controller 42 uses a local random number generator (RNG) to randomly generate a wagering-game outcome from a plurality of possible outcomes. Alternatively, the outcome is centrally determined using either an RNG or pooling scheme at a remote controller included, for example, within the external system 46.

As shown in the example of FIG. 2, the controller 42 is coupled to the system memory 44. The system memory 44 is shown to comprise a volatile memory (e.g., a random-access memory (RAM)) and a non-volatile memory (e.g., an EEPROM), but optionally includes multiple RAM and multiple program memories.

As shown in the example of FIG. 2, the controller 42 is also coupled to a money/credit detector 48. The money/credit detector 48 is configured to output a signal the controller 42 that money and/or credits have been input via one or more value-input devices, such as the bill validator 20, coin acceptor 22, or via other sources, such as a cashless gaming account, etc. The value-input device(s) is integrated with the housing 12 of the gaming terminal 10 and is connected to the remainder of the components of the gaming terminal 10, as appropriate, via a wired connection, such as I/O 56, or wireless connection. The money/credit detector 48 detects the input of valid funds into the gaming terminal 10 (e.g., via currency, electronic funds, ticket, card, etc.) via the value-input device(s) and outputs a signal to the controller 42 carrying data regarding the input value of the valid funds. The controller 42 extracts the data from these signals from the money/credit detector 48, analyzes the associated data, and transforms the data corresponding to the input value into an equivalent credit balance that is available to the player for subsequent wagers on the gaming terminal 10, such transforming of the data being effected by software, hardware, and/or firmware configured to associate the input value to an equivalent credit value. Where the input value is already in a credit value form, such as in a cashless gaming account having stored therein a credit value, the wager is simply deducted from the available credit balance.

As seen in FIG. 2, the controller 42 is also connected to, and controls, the primary display area 14, the player-input device(s) 26, and a payoff mechanism 50. The payoff mechanism 50 is operable in response to instructions from the controller 42 to award a payoff to the player in response to certain winning outcomes that occur in the base game, the bonus game(s), or via an external game or event. The payoff is provided in the form of money, credits, redeemable points, advancement within a game, access to special features within a game, services, another exchangeable media, or any combination thereof. Although payoffs may be paid out in coins and/or currency bills, payoffs are alternatively associated with a coded ticket (from a ticket printer 52), a portable storage medium or device (e.g., a card magnetic strip), or are transferred to or transmitted to a designated player account. The payoff amounts distributed by the payoff mechanism 50 are determined by one or more pay tables stored in the system memory 44.

Communications between the controller 42 and both the peripheral components of the gaming terminal 10 and the external system 46 occur through input/output (I/O) circuit 56, which can include any suitable bus technologies, such as an AGTL+front-side bus and a PCI backside bus. Although the I/O circuit 56 is shown as a single block, it should be appreciated that the I/O circuit 56 alternatively includes a number of different types of I/O circuits. Furthermore, in some embodiments, the components of the gaming terminal 10 can be interconnected according to any suitable interconnection architecture (e.g., directly connected, hypercube, etc.).

The I/O circuit 56 is connected to an external system interface or communication device 58, which is connected to the external system 46. The controller 42 communicates with the external system 46 via the external system interface 58 and a communication path (e.g., serial, parallel, IR, RC, 10bT, near field, etc.). The external system 46 includes, in various aspects, a gaming network, other gaming terminals, a gaming server, a remote controller, communications hardware, or a variety of other interfaced systems or components, in any combination. In yet other aspects, the external system 46 may comprise a player's portable electronic device (e.g., cellular phone, electronic wallet, etc.) and the external system interface 58 is configured to facilitate wireless communication and data transfer between the portable electronic device and the controller 42, such as by a near field communication path operating via magnetic field induction or a frequency-hopping spread spectrum RF signals (e.g., Bluetooth, etc.).

The gaming terminal 10 optionally communicates with external system 46 (in a wired or wireless manner) such that each terminal operates as a "thin client" having relatively less functionality, a "thick client" having relatively more functionality, or with any range of functionality therebetween (e.g., an "intermediate client"). In general, a wagering game includes an RNG for generating a random number, game logic for determining the outcome based on the randomly generated number, and game assets (e.g., art, sound, etc.) for presenting the determined outcome to a player in an audio-visual manner. The RNG, game logic, and game assets are contained within the gaming terminal 10 ("thick client" gaming terminal), the external systems 46 ("thin client" gaming terminal), or are distributed therebetween in any suitable manner ("intermediate client" gaming terminal).

Figure 3:
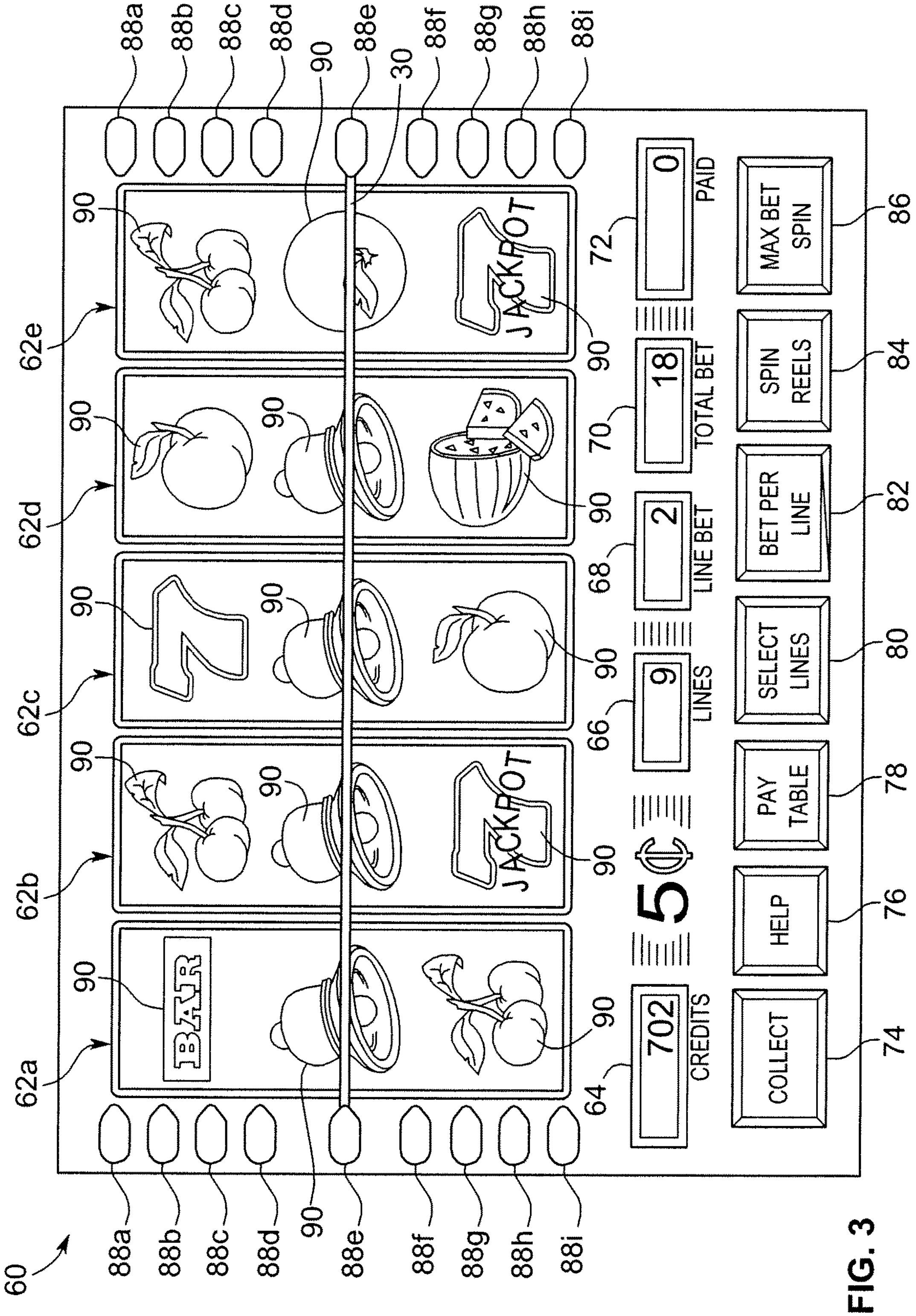
FIG. 3 is a screen shot of a basic-game screen from an exemplary wagering game that can be played, for example, on the gaming terminal of FIG. 1 or the gaming system of FIG. 2.

Referring now to FIG. 3, an image of a basic-game screen 60 adapted to be displayed on the primary display area 14 is illustrated, according to one embodiment of the present disclosure. A player begins play of a basic wagering game by providing a wager. A player can operate or interact with the wagering game using the one or more player-input devices 26. The controller 42, the external system 46, or both, in alternative embodiments, operate(s) to execute a wagering game program causing the primary display area 14 to display the wagering game that includes a plurality of visual elements.

In accordance with various methods of conducting a wagering game on a gaming system in accord with the present concepts, the wagering game includes a game sequence in which a player makes a wager, such as through the money/credit detector 48, touch screen 38 soft key, button panel, or the like, and a wagering-game outcome is associated with the wager. The wagering-game outcome is then revealed to the player in due course following initiation of the wagering game. The method comprises the acts of conducting the wagering game using a gaming apparatus, such as the gaming terminal 10 depicted in FIG. 1, following receipt of an input from the player to initiate the wagering game. The gaming terminal 10 then communicates the wagering-game outcome to the player via one or more output devices (e.g., primary display 14) through the display of information such as, but not limited to, text, graphics, text and graphics, static images, moving images, etc., or any combination thereof. In accord with the method of conducting the wagering game, the controller 42, which comprises one or more processors, transforms a physical player input, such as a player's pressing of a "Spin Reels" soft key 84 (see FIG. 3), into an electronic data signal indicative of an instruction relating to the wagering game (e.g., an electronic data signal bearing data on a wager amount).

In the aforementioned method, for each data signal, the controller 42 is configured to processes the electronic data signal, to interpret the data signal (e.g., data signals corresponding to a wager input), and to cause further actions associated with the interpretation of the signal in accord with computer instructions relating to such further actions executed by the controller. As one example, the controller 42 causes the recording of a digital representation of the wager in one or more storage devices (e.g., system memory 44 or a memory associated with an external system 46), the controller, in accord with associated computer instructions, causing the changing of a state of the data storage device from a first state to a second state. This change in state is, for example, effected by changing a magnetization pattern on a magnetically coated surface of a magnetic storage device or changing a magnetic state of a ferromagnetic surface of a magneto-optical disc storage device, a change in state of transistors or capacitors in a volatile or a non-volatile semiconductor memory (e.g., DRAM), etc.). The noted second state of the data storage device comprises storage in the storage device of data representing the electronic data signal from the controller (e.g., the wager in the present example). As another example, the controller 42 further, in accord with the execution of the instructions relating to the wagering game, causes the primary display 14 or other display device and/or other output device (e.g., speakers, lights, communication device, etc.), to change from a first state to at least a second state, wherein the second state of the primary display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of computer instructions relating to the wagering game is further conducted in accord with a random outcome (e.g., determined by the RNG) that is used by the controller 42 to determine the outcome of the game sequence, using a game logic for determining the outcome based on the randomly generated number. In at least some aspects, the controller 42 is configured to determine an outcome of the game sequence at least partially in response to the random parameter.

The basic-game screen 60 is displayed on the primary display area 14 or a portion thereof. In FIG. 3, the basic-game screen 60 portrays a plurality of simulated movable reels 62*a-e*. Alternatively or additionally, the basic-game screen 60 portrays a plurality of mechanical reels or other video or mechanical presentation consistent with the game format and theme. The basic-game screen 60 also advantageously displays one or more game-session meters and various buttons adapted to be actuated by a player.

In the illustrated embodiment of FIG. 3, the game-session meters include a "credit" meter 64 for displaying a number of credits available for play on the terminal; a "lines" meter 66 for displaying a number of paylines to be played by a player on the terminal; a "line bet" meter 68 for displaying a number of credits wagered (e.g., from 1 to 5 or more credits) for each of the number of paylines played; a "total bet" meter 70 for displaying a total number of credits wagered for the particular round of wagering; and a "paid" meter 72 for displaying an amount to be awarded based on the results of the particular round's wager. The depicted user-selectable buttons include a "collect" button 74 to collect the credits remaining in the credits meter 64; a "help" button 76 for viewing instructions on how to play the wagering game; a "pay table" button 78 for viewing a pay table associated with the basic wagering game; a "select lines" button 80 for changing the number of paylines (displayed in the lines meter 66) a player wishes to play; a "bet per line" button 82 for changing the amount of the wager which is displayed in the line-bet meter 68; a "spin reels" button 84 for moving the reels 62*a-e*; and a "max bet spin" button 86 for wagering a maximum number of credits and moving the reels 62*a-e* of the basic wagering game. While the gaming terminal 10 allows for these types of player inputs, the present disclosure does not require them and can be used on gaming terminals having more, less, or different player inputs.

As shown in the example of FIG. 3, paylines 30 extend from one of the payline indicators 88*a-i* on the left side of the basic-game screen 60 to a corresponding one of the payline indicators 88*a-i* on the right side of the screen 60. A plurality of symbols 90 is displayed on the plurality of reels 62*a-e* to indicate possible outcomes of the basic wagering game. A winning combination occurs when the displayed symbols 90 correspond to one of the winning symbol combinations listed in a pay table stored in the memory 44 of the terminal 10 or in the external system 46. The symbols 90 may include any appropriate graphical representation or animation, and may further include a "blank" symbol.

Symbol combinations are evaluated in accord with various schemes such as, but not limited to, "line pays" or "scatter pays." Line pays are evaluated left to right, right to left, top to bottom, bottom to top, or any combination thereof by evaluating the number, type, or order of symbols 90 appearing along an activated payline 30. Scatter pays are evaluated without regard to position or paylines and only require that such combination appears anywhere on the reels 62*a-e*. While an embodiment with nine paylines is shown, a wagering game with no paylines, a single payline, or any plurality of paylines will also work with the present disclosure. Additionally, though an embodiment with five reels is shown in FIG. 3, different embodiments of the gaming terminal 10 comprise a greater or lesser number of reels in accordance with the present disclosure.

Figure 4:
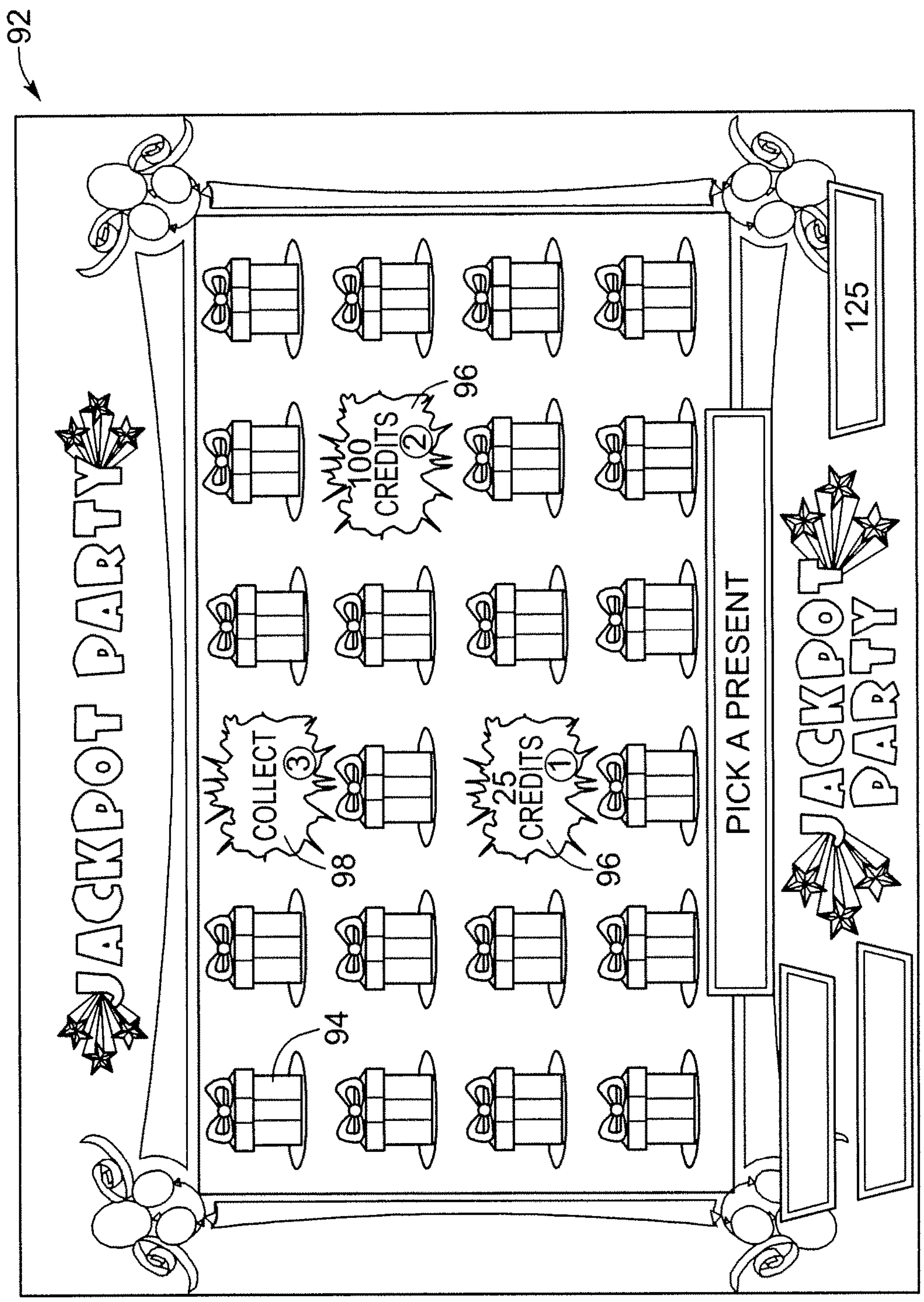
FIG. 4 is a screen shot of a bonus-game screen from an exemplary wagering game that can be played, for example, on the gaming terminal of FIG. 1 or the gaming system of FIG. 2.

Turning now to FIG. 4, an example of a bonus game to a basic wagering game is illustrated. A bonus-game screen 92 includes an array of markers 94 located in a plurality of columns and rows. The bonus game is entered upon the occurrence of a triggering event, such as the occurrence of a start-bonus game outcome (e.g., symbol trigger, mystery trigger, time-based trigger, etc.) in or during the basic wagering game. Alternatively, any bonus game described herein is able to be deployed as a stand-alone wagering game independent of a basic wagering game.

In the illustrated bonus game of FIG. 4, a player selects, one at a time, from the array of markers 94 to reveal an associated bonus-game outcome. According to one embodiment of this bonus game, each marker 94 in the array is associated with an award outcome 96 (e.g., credits or other non-negative outcomes) or an end-game outcome 98. In the illustrated example, a player has selected an award outcome 96 with the player's first two selections (25 credits and 100 credits, respectively). When one or more end-game outcome 98 is selected (as illustrated by the player's third pick), the bonus game is terminated and the accumulated award outcomes 96 are provided to the player.

Figure 5:
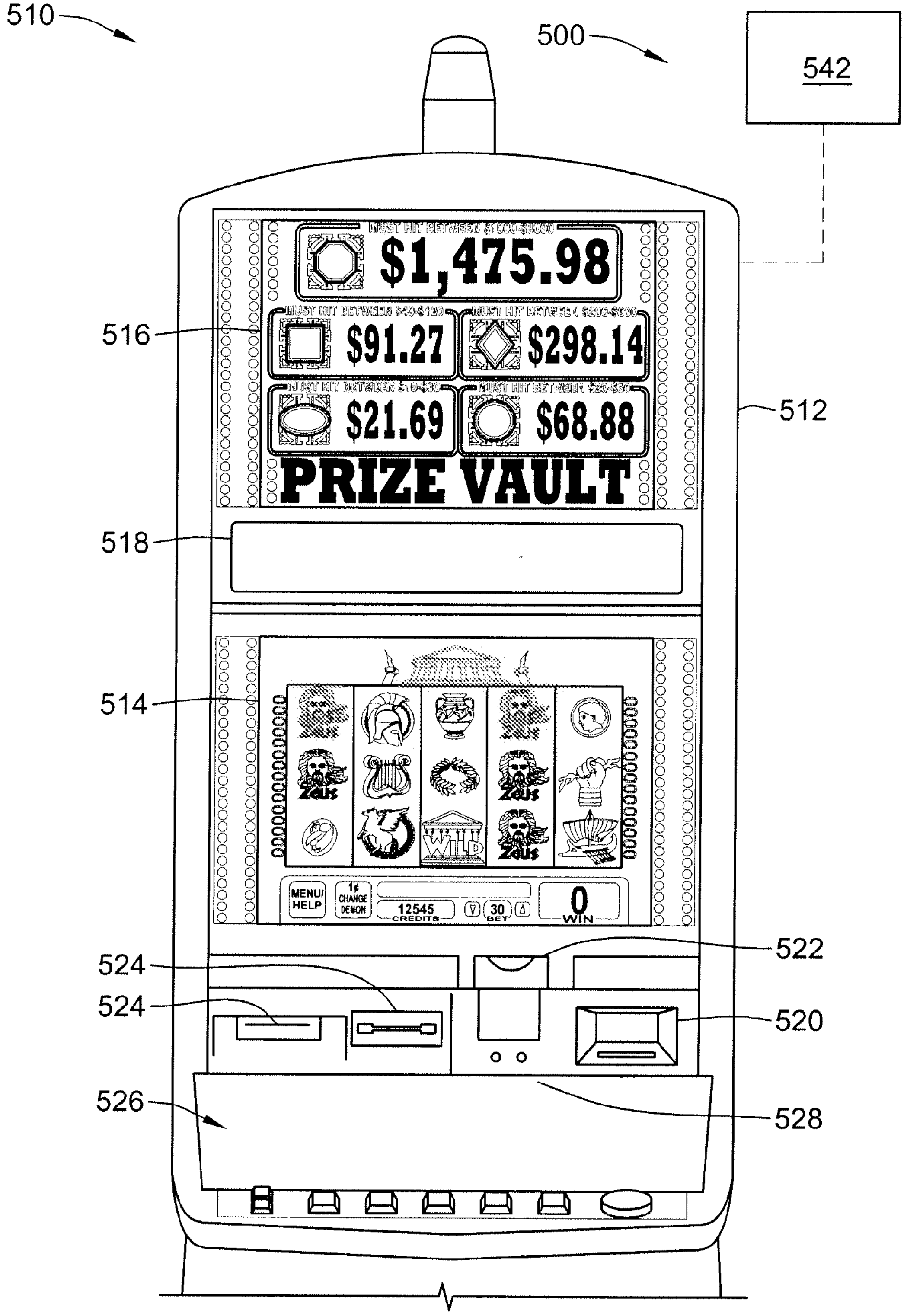
FIG. 5 is a perspective-view illustration of a representative gaming terminal for playing an exemplary progressive wagering game in accordance with aspects of the present disclosure.

Referring now to FIG. 5, an exemplary gaming terminal, designated generally at 510, for playing one or more wagering games is shown in accordance with aspects of the present disclosure. Although differing in appearance, the gaming terminal 510 can be similar in function, operation, and connectivity to the gaming terminal 10 discussed above with respect to FIGS. 1 and 2. The gaming terminal 510 (also referred to herein as "wagering game machine" or "gaming machine") can take on various configurations including, for example, free standing gaming machines (e.g., gaming terminal 10 of FIG. 1), handheld or portable gaming machines (not shown), countertop gaming machines (not shown), personal computers or laptop computers (not shown), or any combination thereof. To that end, the gaming terminal 510 may be an electromechanical gaming terminal configured, for example, to play mechanical slots, or it may be an electronic gaming terminal configured, for example, to play a video casino game, such as keno, poker, slots, blackjack, roulette, or a combination of both. Markedly, the gaming terminal 510 of FIG. 5 is purely representative in nature, and presented solely for explanatory purposes. As such, the aspects of the present disclosure are in no way limited to the terminal configuration shown in the drawings.

The illustrated gaming terminal 510 comprises a cabinet 512 for housing and/or supporting a variety of operational componentry (e.g., CPU 42, memory 44, external systems interface 58, etc.). For output devices, the gaming terminal 510 includes a primary display area (or "first display device") 514, a secondary display area (or "second display device") 516, and a tertiary display area (or "third display device") 518. Recognizably, one or more of the foregoing display areas/devices can be combined into a single display area/device. For input devices, the gaming terminal 510 may include a bill-receiving and validating device 520, a coin acceptor 522, one or more information readers 524, one or more player-input devices 526, and one or more player-accessible ports 528 (e.g., an audio output jack for headphones, a video headset jack, an internet cable jack, a wireless transmitter/receiver, etc.). While these typical components found in the gaming terminal 510 are described above, it should be understood that numerous additional/alternative peripheral devices and other elements may exist and may be used in any number of combinations to create various forms of a gaming terminal.

Similar to embodiments presented above in FIGS. 1 and 2, the gaming terminal 510 of FIG. 5 may communicate with an external system (e.g., external system(s) 46 of FIG. 2) such that the terminal operates as a "thin client," a "thick client," or through any range of functionality therebetween. By way of example, a controller is schematically illustrated at 542 in FIG. 5 operatively connected to the gaming terminal 510 such that the gaming terminal 510 can access and/or engage in external game-related and non-game related features, such as a shared game, a community game, a wide area progressive (WAP) game, a local area progressive (LAP) game, etc. The controller 542 may be similarly configured in accordance with any of the optional configurations and features described above with respect to the CPU 42 of FIG. 2. In some optional embodiments, the controller 542 takes on the form of a central server, central controller, or remote host that links to the gaming terminal 510 through a data network or remote communication link 544. To that end, the processor of the gaming terminal 510 can be designed to transmit and receive events, messages, commands, and/or any other suitable data or signals to and from the controller 542. In combination, the gaming terminal 510 and controller 542 can be considered part of a gaming system 500.

Figure 6:
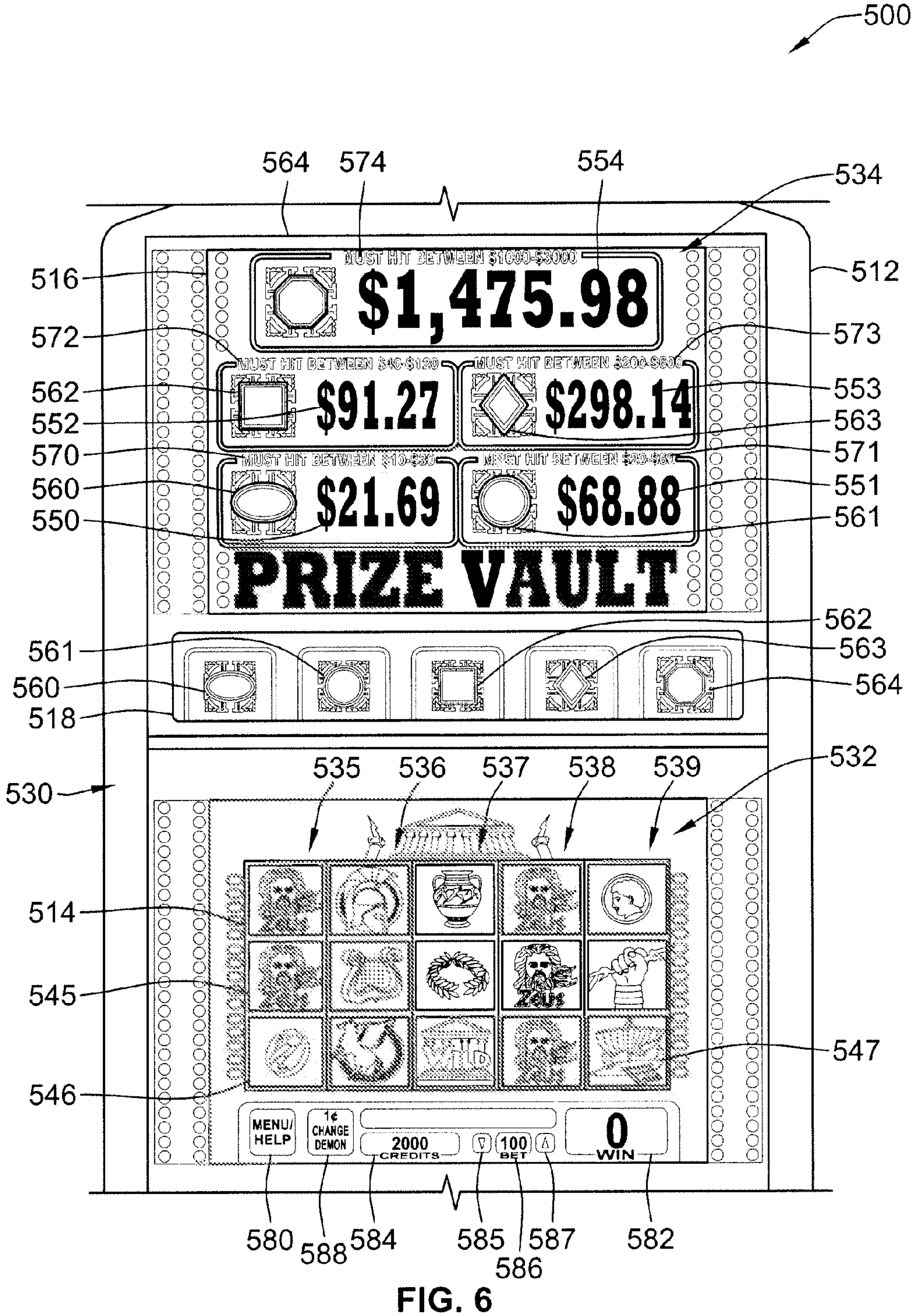
FIG. 6 is a screen shot of a basic-game screen and a progressive-game screen from an exemplary wagering game in accordance with aspects of the present disclosure.

In FIG. 6, the primary, second and tertiary display areas 514, 516, 518 of the gaming terminal 510 of the gaming system 500 are shown. The first display device 514 displays or otherwise visually depicts a first instance or portion (e.g., a base game) 532 of a wagering game 530, which in this example is the slot game shown in FIG. 6. The wagering game 530 includes a plurality of symbol-bearing reels, designated generally as 535-539, respectively, each having a plurality of distinct symbol positions and bearing a variety of different symbols (collectively represented by symbols 545-547 in FIG. 6). The symbols may include any variety of graphical symbols, emblems, elements, or representations, including symbols that are associated with one or more themes (e.g., a Greek mythology theme) of the gaming terminal 510 or gaming system 500. The symbols may also include a blank symbol or empty space. The symbols on the reels 521-525 are arranged in an array or matrix, which in this embodiment is a 3×5 matrix of symbols. The reels 521-525 are varied (e.g., spun and stopped) to reveal combinations of symbols, which represent randomly selected outcomes of the wagering game 530, that are evaluated for winning combinations. Winning combinations of symbols landing, for example, on activated paylines (e.g., those paylines for which a wager has been received), cause awards to be paid in accordance with one or more pay tables associated with the gaming system 500.

The wagering game 530 can include fewer or additional symbol-bearing reels (simulated, mechanical, or combinations thereof) and/or symbol bearing positions than those shown in FIG. 6. In alternate embodiments, the randomly selected outcomes may comprise greater or fewer than 15 symbols, and may take on a variety of different forms having greater or fewer rows and/or columns. The matrix may even comprise other non-rectangular forms or arrangements of symbols. Moreover, the randomly selected outcomes of the wagering game 530 may be varied from the representation provided in FIG. 6. Likewise, the Greek mythology theme is purely illustrative and non-limiting in nature.

The primary display 514 further includes certain display features for providing information and options to a player. For example, the display 514 features may include a MENU/HELP button 580, a WIN meter 582, a CREDITS meter 584, and a BET meter 586. The MENU button 580 can be pressed and activated (e.g., through an overlying touch screen) by a player desiring to access other control menus, preferences, help screens, etc. For example, the player can change a theme of the wagering game 530 via the MENU button 580, or change the type of wagering game being played (e.g., to video poker, keno, etc.). The WIN meter 582 displays to the player the amount of the total win (if any) from the most recent play of the wagering game 530. The CREDITS meter 584 displays to the player the total amount of credits (if any) remaining and available to the player for play of the wagering game 530. The BET meter 586 displays to a player the current size of his/her wager (in credits). Fewer, additional or alternative display features may be included for presenting information/options to a player. The primary display 514 can also include, for example, an optional change-denomination feature 588 that can be activated to change the denomination of wagers (e.g., from $0.25 to $1.00) which the player is inputting into the system 500, and bet change buttons 585 and 587 that permit a player to increase and decrease, respectively, the size of his/her wager accordingly. Optionally, a "max bet spin" button may be provided for wagering a maximum number of credits and contemporaneously spinning the reels of the wagering game 530, as well as any of the buttons and meters displayed in FIG. 3.

With continuing reference to FIG. 6, the screen shot of the second display 516 illustrates a second instance or portion (e.g., a multi jackpot progressive game) 534 of the wagering game 530. The multi jackpot progressive game 534 of FIG. 6 can be a wide area progressive (WAP), a local area progressive (LAP), a stand alone progressive (SAP), a portal application, or selected combinations thereof. The PRIZE VAULT progressive game 534 includes one or more progressive jackpots (also referred to herein as "progressive levels") 550-554, each of which may be associated with a respective icon or marker 560-564, respectively. By way of non-limiting example, a first progressive jackpot 550 with a first progressive value (e.g., $21.69 in FIG. 6) is associated with a first icon 560 (e.g., an oval-shaped jewel). A second progressive jackpot 551 with a second progressive value (e.g., $68.88 in FIG. 6) is associated with a second icon 561 (e.g., a circular jewel in FIG. 6), whereas a third progressive jackpot 552 with a third progressive value (e.g., $91.27 in FIG. 6) is associated with a third icon 562 (e.g., a square jewel in FIG. 6). In addition, a fourth progressive jackpot 553 with a fourth progressive value (e.g., $298.14 in FIG. 6) is associated with a fourth icon 563 (e.g., a diamond-shaped jewel in FIG. 6), while a fifth progressive jackpot 554 with a fifth progressive value (e.g., $1,475.98 in FIG. 6) is associated with a fifth icon 564 (e.g., a pentagonal jewel in FIG. 6). Recognizably, the PRIZE VAULT progressive game 534 can include greater or fewer than five progressive jackpots, each having a progressive value that differs from that which is shown in the drawings. Moreover, the various progressive values illustrated in FIG. 6 are purely exemplary in nature, and are in no way limiting.

In the illustrated embodiment, the linking or association between the individual progressive jackpots 550-554 and a respective icon/marker 560-564 is intended merely as a way to visually depict to a player, for example, via the second and/or third display devices 516, 518 when a particular jackpot is active (i.e., when the player is eligible to win a progressive jackpot 550-554). As will be explained below during the discussion of FIG. 7, the third display device 518 indicates that a progressive jackpot 550-554 is active or eligible by enlarging, flashing, setting off, or otherwise emphasizing the corresponding icon 560-564 associated with each active jackpot. Recognizably, the eligibility of one or more of the progressive jackpots 550-554 can be achieved by implementations other than the manner illustrated in the drawings and discussed above. For example, eligibility for a particular progressive jackpot can be indicated by enlarging, flashing, setting off, or otherwise emphasizing the value associated with each active jackpot. As an additional or alternative option, an audible indication can also be provided.

Figure 7:
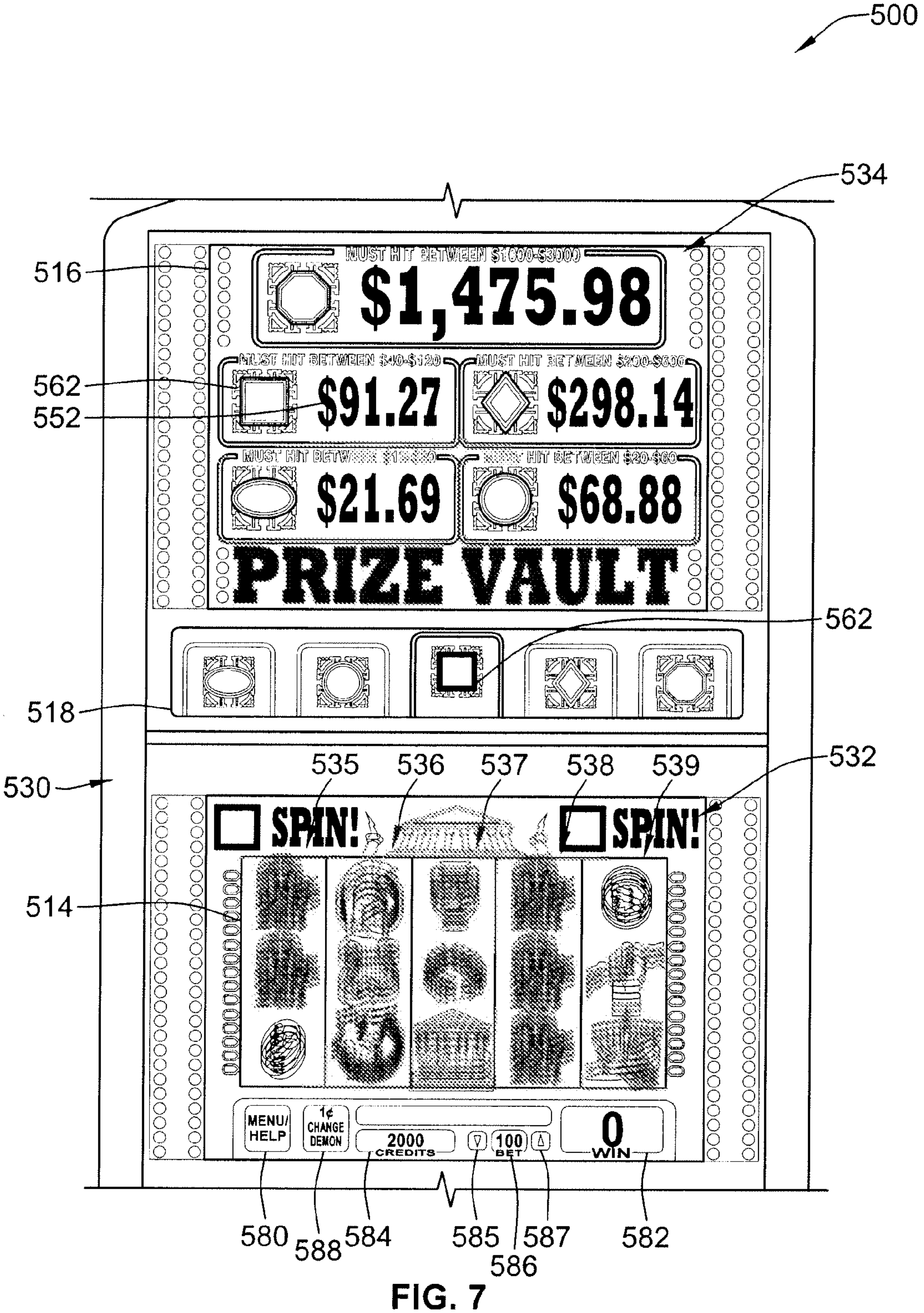
FIG. 7 is another screen shot of the basic-game screen and the progressive-game screen of FIG. 6, showing one or more of the progressive jackpots being randomly activated in response to the varying of the symbol-reels in the basic game.
Figure 8:
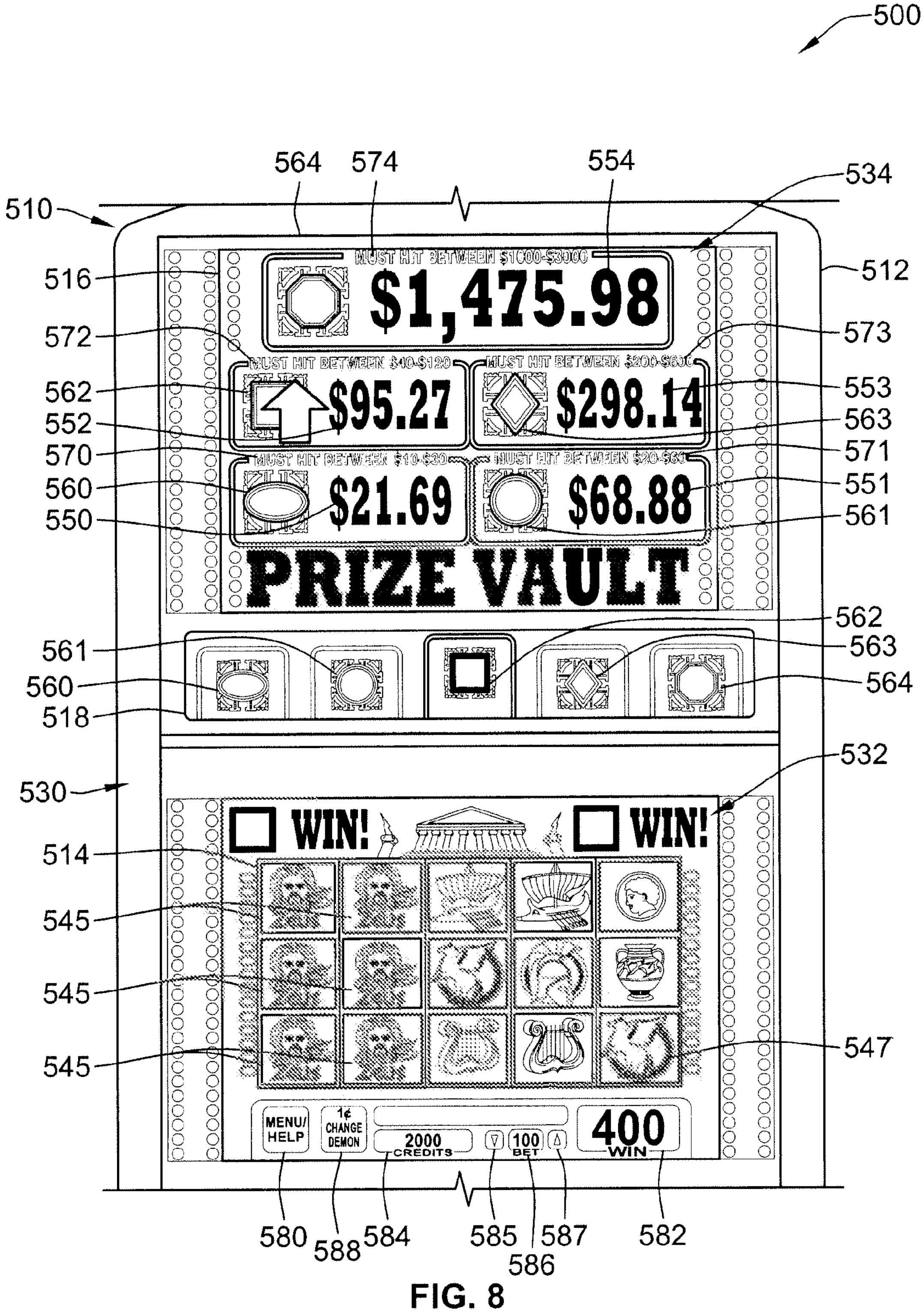
FIG. 8 is another screen shot of the basic-game screen and the progressive-game screen of FIG. 6, showing one or more of the progressive jackpots being incremented in response to an award-winning outcome in the basic game.

Turning now to FIG. 7, where like reference numerals refer to like objects from FIGS. 5 and 6, the wagering game 230 is shown after play of the base game 532 is initiated, for example, by the player providing a wager and pushing a spin button or pulling a spin lever. The monetary wager (e.g., a selected number of credits) is deducted from the available credits, as displayed via the CREDITS meter 584. The monetary wager that is in play can be displayed via the BET meter 586. FIG. 7 illustrates the reels 535-539 being varied—e.g., spun and stopped; the reels continue to spin until they are stopped to reveal combinations of symbols which represent a randomly selected outcome of the base game, as seen in FIG. 8. The base-game outcome is, according to some aspects, randomly determined from a plurality of potential base-game outcomes. As indicated above, each outcome is evaluated for winning combinations—to determine if the base-game outcome has one or more base-game awards associated therewith.

A local controller (e.g., CPU 42 of FIG. 2), a host system (e.g., external system 46 of FIG. 2), the central controller 542 (FIG. 5), or any combination thereof, in alternative embodiments, operates to execute the wagering game program causing each of the various display areas 514, 516, 518 to display selected portions of the wagering game 530. An outcome of the wagering is randomly selected from a plurality of potential wagering-game outcomes (e.g., using a local random number generator (RNG)). The wagering-game outcome is then revealed, displayed, or otherwise communicated to the player, for example, on a corresponding display 514. In FIG. 6, the game screen 514 displays the wagering-game outcome by portraying the plurality of simulated reels 521-525 spinning and stopping to reveal a plurality of symbols arranged in an matrix. A winning combination occurs, for example, when the displayed symbols correspond to one or more of the winning symbol combinations listed in a pay table. In response, a base-game prize (also referred to herein as "base-game award") associated with a winning outcome in the first instance 532 of the wagering game 530 of FIG. 6 is conferred upon the player.

Prior to, contemporaneously with, or subsequent to the reels 535-539 being spun and stopped, one or more of the progressive jackpots 550-554 can be activated such that the player is eligible to win the corresponding progressive value associated with each active jackpot. In some embodiments, every wagered play of the base wagering game 532 includes the possibility of activating one or more of the progressive jackpots 550-554. Alternatively, only certain plays of the base wagering game 532 (i.e., where a max bet has been placed) offers a chance of activating one or more of the progressive jackpots 550-554. Although it may be desirable that the execution of the aforementioned determination sequence be systematic (e.g., executed during every play, executed for every max bet, etc.), execution of the determination sequence can be random and arbitrary, in some embodiments.

In the illustrated embodiment, responsive to play of the base game 532 being initiated and prior to displaying the outcome of each play of the wagering game 530 via a display device, such as the primary display 514, it is determined, for example, via controller 542 whether to activate one or more of the progressive jackpots 550-554. This determination, as illustrated in FIG. 7, is random (e.g., using an RNG) and conducted on a spin-by-spin basis. Some aspects of the present disclosure may include activating one or more progressive jackpots 550-554 in response to a triggering event in the base game 532, as discussed in the subsequent paragraph. Alternatively, activation of the progressive jackpots 550-554 can be arbitrary and/or completely disassociated from the base wagering game 532. The probability of activating each of the progressive jackpots 550-554 may be similar or different. By way of example, and not limitation, some preferred embodiments may include the first, second, third, and fourth progressive jackpots 550-553 being activated once in every 60 spins, on average, while the fifth progressive jackpot 551 is activated only once in every 75 spins, on average. Alternate arrangements may require each progressive jackpot 550-554 have a different probability of being activated, while in other exemplary arrangements all of the progressive jackpots 550-554 have the same probability of being activated. FIG. 7 indicates that the third progressive jackpot 552 has been activated, which is visually depicted to the player by moving, highlighting and offsetting the third icon 562 in the third display device 518.

During play of the wagering game 530, which may include times when the reels 521-525 are being spun and stopped, as well as intermittent times therebetween, or any time that a player is present at the gaming terminal 510, certain triggering events may trigger activation of one or more of the progressive jackpots 550-554. In alternate embodiments, the triggering event is dependent on the displayed outcome of the wagering game, for example, a symbol-driven ("symbol-based") triggering event. A symbol-driven triggering event, may comprise, for example, three or more symbols aligning on an active payline, symbols being arranged in predetermined patterns, or a triggering symbol(s) appearing anywhere in the displayed outcome of the wagering game 530. In other embodiments, player selection of an appropriate selectable element may reveal an award, which may include triggering a progressive jackpot 550-554. In yet other embodiments, the outcome-based triggering events may include accumulation of certain assets or advancement to certain stages or episodes within the game.

Other triggers may be based upon the time playing the wagering game 530 ("time on device") or the size and/or number of wagers. According to one specific example, in an embodiment, one or more of the progressive jackpots 550-554 may be triggered in a "mystery" fashion. A mystery trigger is a trigger that is generally independent of the displayed outcome(s) of the wagering game 530. Instead, a mystery triggering event is communicated to the player when it occurs, but the player may be unaware of what caused the triggering event. Such "mystery" triggering events may be driven by a number of mechanics that are not observable by the player. For example, the mystery trigger may be a randomly selected event, such as intermittently randomly selecting a number from a pool of numbers until the selected number matches a triggering number or range of numbers. In yet other embodiments, mystery triggering events may include a threshold time playing a wagering game 530 (time on device), total wagers input meeting a predetermined amount (coin in), accumulation of a certain amount of credits, points, or assets, etc.

FIG. 8 provides an exemplary screen shot of the first, second and third display devices 514, 516, 518 displaying the wagering game 230 after completion of the game play illustrated in FIG. 7. In this example, the completed game play results in a winning outcome in the base game 532. In particular, there are two or more ZEUS symbols 545 aligned along multiple active paylines. Each winning combination of symbols that landed on an activate payline causes a corresponding award to be paid in accordance with a pay table (not shown) that is associated with the wagering game 530. In this instance, the cumulative award from the various winning symbol combinations is 400 credits, which may be displayed to the player on the primary display device 514 in the WIN meter 582. The resultant award may subsequently be added to the CREDITS meter 584, and is therefore available to the player for subsequent play of the wagering game 530.

The PRIZE VAULT progressive game 534 presented in FIGS. 5-8 is a "threshold triggered" progressive game. Each of the progressive jackpots 550-554 shown in FIG. 8 has an individual progressive value (also referred to herein as "incrementing progressive value") 560-564 and a respective trigger value, which is not displayed to the player in the illustrated embodiment to increase player anticipation. In a progressive jackpot game that is threshold triggered, the progressive value for each progressive jackpot 550-554 is gradually increased until it meets or exceeds its respective trigger value, at which point the progressive jackpot value is awarded to the player. The trigger values may be static or may vary. In the former instance, for example, an operator of the gaming establishment can set the trigger value for each progressive jackpot 550-554 during the initial setup and configuration of the PRIZE VAULT progressive game 534. In the latter instance, for example, the trigger value for each progressive jackpot 550-554 can vary systematically (e.g., be changed by a predetermined amount at predetermined time intervals) or randomly (e.g., changed to an arbitrary amount at selected times).

Some aspects of the present disclosure include randomly selecting each trigger value from a respective range of trigger values 570-574. In some embodiments, a new trigger value is selected each time the progressive value of a respective progressive jackpot is set to a reset value (e.g., the value at which the progressive jackpot is reset to after being awarded to a player). Each of the respective ranges of trigger values 570-574 illustrated in FIG. 8 is different, according to some embodiments. In particular, the first trigger value range 570 for the first progressive jackpot 550 is between $10 and $30; the second trigger value range 571 for the second progressive jackpot 551 is between $20 and $60; the third trigger value range 572 for the third progressive jackpot 552 is between $40 and $120; the fourth trigger value range 573 for the fourth progressive jackpot 553 is between $200 and $600; and the fifth trigger value range 574 for the fifth progressive jackpot 550 is between $1000 and $3000. Although shown in the drawings as being distinct and generally unrelated, the progressive values and/or range of trigger values of the progressive jackpots 550-554 can be similar and have at least some correlation to one another. In one example, the third trigger value for the third progressive jackpot 552 is randomly selected from within the third trigger value range 572 (e.g., the random selection for the next progressive trigger may be $92.48). When an increment amount is added to the third progressive jackpot 552 such that the progressive value thereof meets or exceeds the trigger amount, the incremented progressive value is awarded to the player whose increment caused the trigger amount to be met/exceeded.

The exemplary screen shot provided in FIG. 8 depicts the third progressive jackpot 552 being active (e.g., moves, highlights and offsets the third icon 562 in the third display device 518) and the most recent outcome of the base game 532 having one or more base-game awards associated therewith, as described above. Responsively, the base-game award is conferred upon the player, as indicated on the primary display device 514 by the WIN meter 582. Additionally, the respective progressive value of the active progressive jackpot 552 is increased by an increment amount that corresponds to the value of the award conferred in the base game 532. In some embodiments, the increment amount is equal to at least the base-game award. In alternate embodiments, the increment amount is equal to the base-game award as modified by an award modifier. For example the increment amount may be equal to the base-game award multiplied by a randomly determined multiplier. Alternatively, the increment amount may be equal to the base-game award as decremented by a predetermined penalty amount. In the illustrated example, the progressive value of the active progressive jackpot 552 is increased by 400 credits (or $4.00) from the previous progressive value of $91.27 (FIG. 6) to an incremented progressive value of $95.27 (FIG. 8). In other embodiments, an active progressive jackpot is incremented for only selected base-game winning outcomes. That is, the multi jackpot progressive game 534 determines if the base-game award is one of a plurality of selected base game awards. In this instance, the respective progressive value of the active progressive jackpot is incremented by the increment amount only if the base-game award is one of the selected base game awards (see FIGS. 10 and 11).

If the incremented progressive value of the active progressive jackpot 552 is equal to or greater than the current trigger value, the incremented progressive value of the progressive jackpot 552 is conferred upon the player. In the illustrated example, the active progressive jackpot 552 has an incremented progressive value of $95.27 (FIG. 8); if the current progressive trigger is $92.48, in a non-limiting example, the incremented progressive value of $95.27 is awarded to the player and, in some embodiments, the progressive jackpot 552 is reset to a reset value. On the other hand, if the incremented progressive value ($95.27 in FIG. 8) is less than the current progressive trigger (e.g., $100.35), the incremented progressive value of $95.27 is not awarded to the player. In a similar regard, if none of the progressive jackpots 550-554 is active even though the outcome of the base game 532 has one or more base-game awards associated therewith, none of the progressive jackpots 550-554 is incremented, the base-game award is provided to the player, and the current play of the base game 532 is terminated. Moreover, if one or more of the progressive jackpots 550-554 is active, yet the completed game play of the base game 532 does not result in a winning outcome (i.e., there are no awards associated with the outcome of the base game), the current play of the base game 532 is terminated without awarding any of the base-game awards or any of the progressive jackpots 550-554.

Optional embodiments include the incremented progressive value of one or more active progressive jackpots 550-554 being awarded in response to a jackpot triggering event. The jackpot triggering event can take on any of the assorted forms described above (e.g., "symbol-based" triggering events, "time-on-device-based" triggering events, "mystery-type" triggering events, etc.). Alternatively, the jackpot triggering event can include the incremented progressive value of an active progressive jackpot being equal to or greater than its respective trigger value, as described in the preceding paragraphs. As yet another alternative, the jackpot triggering event can include a number of random draws, each draw randomly selecting from a pool of win/no win results. This selection process may include a binary-type random number generator, where all randomly selected "1's" are a winning result (i.e., one or more progressive jackpots 550-554 are provided to the player), whereas all randomly selected "0's" are a non-winning result (i.e., none of the progressive jackpots 550-554 are presented to the player). The number of random draws may be based, at least in part, on the amount of the base-game award. For instance, the higher the credit amount awarded to the player during the base game 532, the more random draws allotted to determine whether one or more of the progressive jackpots will be conferred upon the player.

Although only one of the progressive jackpots 550-554 is shown as being active in FIGS. 7 and 8, it is also possible, in some embodiments, for multiple jackpots 550-554 to be activated during execution of the wagering game 530. In this instance, if multiple progressive jackpots 550-554 are active concurrent with a winning base-game outcome, the multi jackpot progressive game 534 will responsively increment the respective progressive values of all of the active progressive jackpots 550-554 by an increment amount. The increment may be the same for all of the active progressive jackpots 550-554 or may vary from jackpot-to-jackpot or among groups of active jackpots. Alternatively, only selected ones of the progressive jackpots 550-554 will be incremented. For each active progressive jackpot 550-554, it will then be determined if the incremented progressive value is equal to or greater than its respective trigger value. If so, the player is awarded all of the active progressive jackpots 550-554 with an incremented progressive value that is equal to or greater than its respective trigger value. Alternatively, the player is awarded one or more, but not all, of the incremented respective progressive values that are equal to or greater than their respective trigger values. By way of non-limiting example, the player may be awarded only a limited number of the multiple active progressive jackpots 550-554, the number of awarded jackpots being dependent upon the size of the player's wager for the most recent play of the wagering game 530. In a non-limiting example, a player will be awarded all of the active progressive jackpots 550-554 with an incremented progressive value that is equal to or greater than its respective trigger value if the player's wager for the most recent play of the wagering game 530 was a maximum bet. However, the player will only be awarded, for example, X % of the active progressive jackpots 550-554 with an incremented progressive value that is equal to or greater than its respective trigger value when the player's wager for the most recent play of the wagering game 530 was X % of the maximum available bet.

One optional gaming feature for the disclosed concepts includes allocating any supplemental increment value—value which is added to the progressive value of an active jackpot that is above the trigger value at which that progressive jackpot is awarded, to the reset value for the progressive jackpot. In other words, if the incremented progressive value of an active progressive jackpot is greater than its respective trigger value, a remainder amount is determined. The remainder amount is equal to the incremented respective progressive value less the respective trigger value. In the illustrated example, the active progressive jackpot 552 has an incremented progressive value of $95.27 and a current progressive trigger is $92.48; thus, the remainder amount in this example is $2.79. The progressive jackpot is awarded to the player, after which the respective progressive value of the active progressive jackpot 552 is reset to a corresponding reset value, for example $40. The remainder amount of $2.79 is then added to the reset value for a reset progressive value of $42.79. Subsequently, or contemporaneously therewith, a new trigger value can be determined for the reset progressive jackpot. If the reset progressive value of the active progressive jackpot is equal to or greater than the new trigger value (e.g., the new trigger value=$41.89), the multi jackpot progressive game 534 will award the active progressive jackpot to the player again. As can be seen from the foregoing description, this optional gaming feature allows a player to win a single progressive jackpot multiple times in a single play of the PRIZE VAULT progressive game 534.

Figure 9:
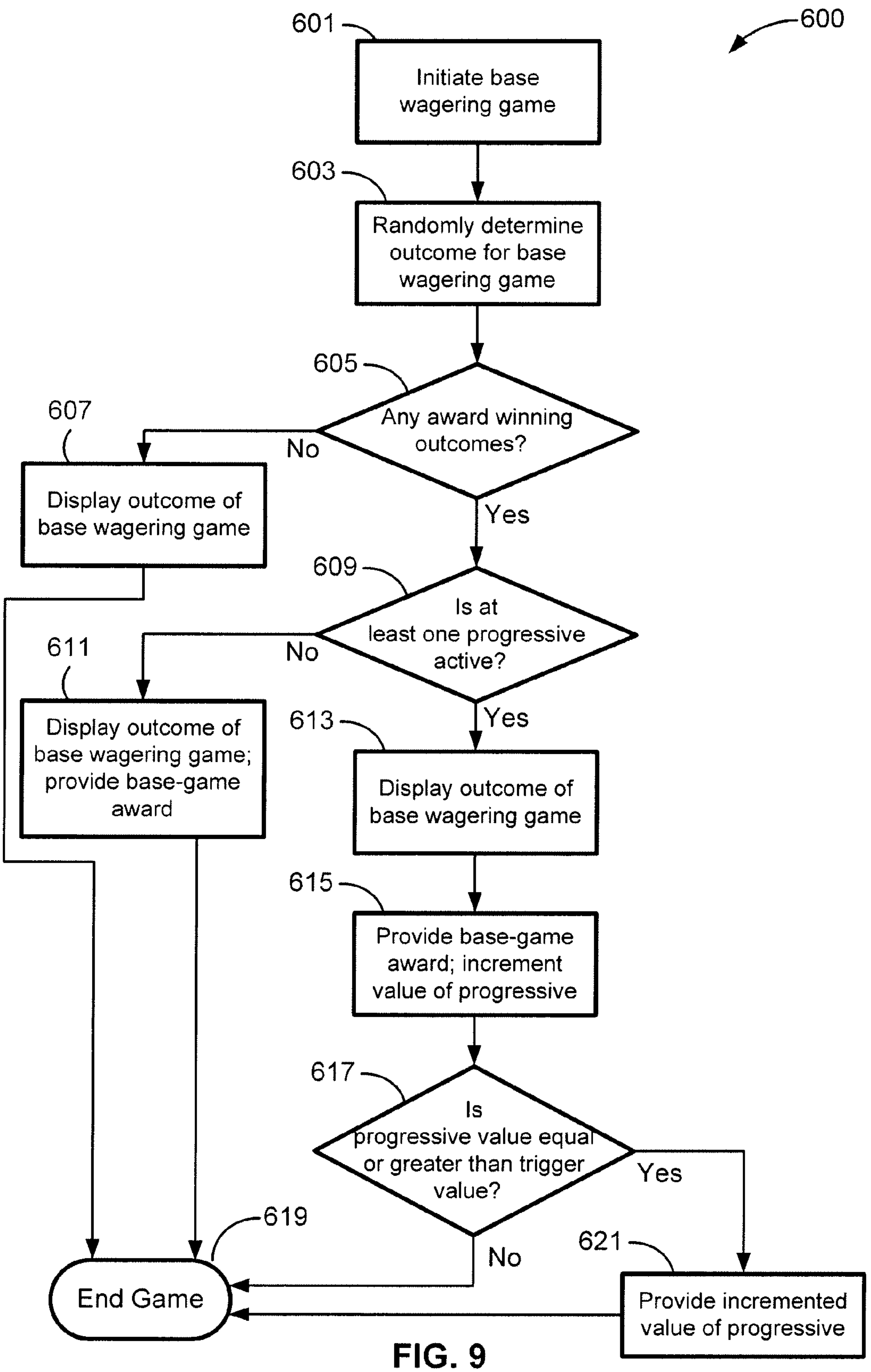
FIG. 9 is a flowchart for an exemplary algorithm that corresponds to instructions that can be executed by a controller in accord with at least some aspects of the disclosed concepts.

With reference now to the flow chart of FIG. 9, an improved method for conducting a wagering game on a gaming terminal, such as gaming terminal 510 of FIG. 5, and/or a gaming system, such as gaming system 500 of FIG. 5, is generally described at 600 in accordance with certain embodiments. FIG. 9 represents an algorithm that corresponds to at least some instructions that can be stored, for example, in memory 44 of FIG. 2, and executed, for example, by the controller 42, external system(s) 46 of FIG. 2, and/or controller 542 of FIG. 5 to perform any or all of the above or below described functions associated with the disclosed concepts.

The exemplary algorithm 600 of FIG. 9 starts, at block 601, with initiating a first instance of a wagering game, such as the base game 532 of the wagering game 530 depicted in FIGS. 5-8. At block 603, the exemplary method 600 includes determining (e.g., via CPU 542 of FIG. 6) an outcome of the first instance of the wagering game. As described above, the base-game outcome can be randomly determined, e.g., via an RNG, from a plurality of base-game outcomes. It is then determined, at block 605, whether the first-instance outcome has any awards associated therewith. These awards may stem from symbol-driven outcomes, as illustrated in FIG. 8, and non-symbol-driven outcomes, as illustrated in FIG. 4. If the first-instance outcome does not have any awards associated therewith (Block 605=NO), the method 600 proceeds to block 607, where the outcome of the first instance of the wagering game is presented to the player, for example, on the primary display 514, and the first instance of the wagering game ends at block 619.

If the first-instance outcome has one or more awards associated therewith (Block 605=YES), the method 600 proceeds to block 609, where it is determined whether or not one or more progressive jackpots, such as progressive jackpots 550-554 of FIGS. 5-8, associated with the wagering game are active. If not (BLOCK 609=NO), the method 600 proceeds to block 611, where the outcome of the first instance of the wagering game is presented to the player, for example, on the primary display 514, the award(s) achieved in the first-instance of the wagering game are provided to the player, and the first instance of the wagering game ends at block 619. If, however, one or more of the progressive jackpots associated with the wagering game are active (BLOCK 609=YES), the method 600 proceeds to block 613, where the outcome of the first instance of the wagering game is presented to the player, for example, on the primary display 514. In response to one or more of the progressive jackpots being active concurrent with a first-instance outcome that has one or more awards associated therewith, block 615 includes conferring the first-instance outcome award(s) to the player and incrementing the respective progressive value of some or all of the active progressive jackpot by an increment amount that corresponds to the first-instance outcome award(s).

At block 617, the method 600 includes determining whether the incremented progressive value for each of the active progressive jackpots is equal to or greater than a respective trigger value, similar to the assessment described above with respect to FIG. 8. If not (Block 617=NO), the method 600 proceeds to block 619 and terminates the first instance of the wagering game. In contrast, if the incremented progressive value of one or more active progressive jackpots is equal to or greater than their respective trigger values (Block 617=YES), the method 600 proceeds to block 621 where the incremented progressive values of some or all of the active progressive jackpots which meet or exceed their respective trigger values are awarded to the player. From block 621, the first instance of the wagering game terminates at block 619.

In some embodiments, the method includes at least those steps enumerated above. It is also within the scope and spirit of the present invention to omit steps, include additional steps, and/or modify the order presented above. It should be further noted that the method 400 represents a single play of a wagering game. However, it is expected that the method 400 be applied in a systematic and repetitive manner.

Figure 10:
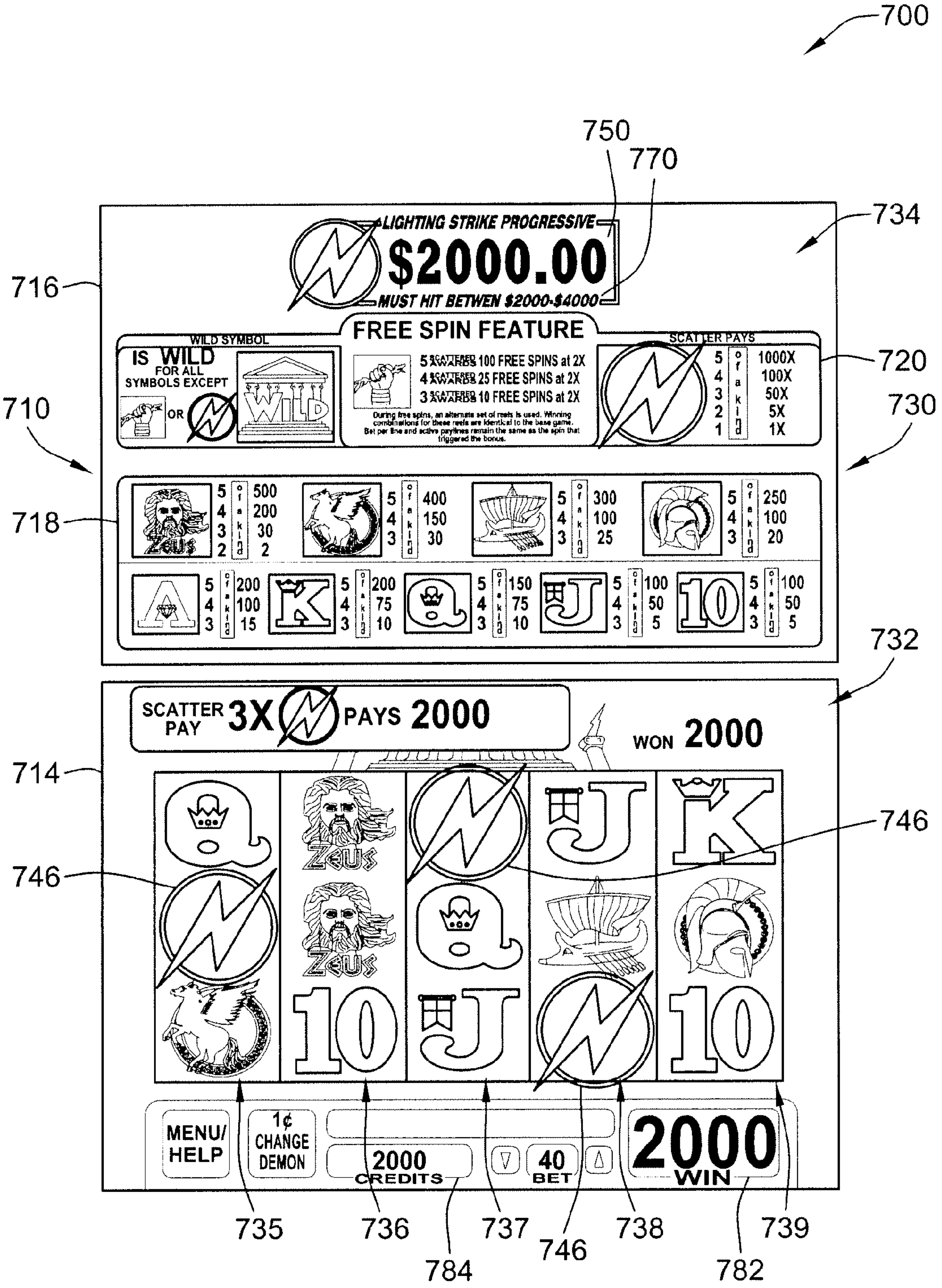
FIG. 10 is a screen shot of a basic-game screen from an exemplary wagering game in accordance with aspects of the present disclosure.

Turning next to FIG. 10, a primary display device 714 and secondary display device 716 of a gaming terminal 710 of a gaming system 700 is shown. The primary display device 714 displays or otherwise visually depicts a first instance or portion (e.g., a base game) 732 of a wagering game 730, which in this example is the slot game shown in FIG. 10. The wagering game 730 includes a plurality of symbol-bearing reels, designated generally as 735-739, respectively, each having a plurality of distinct symbol positions and bearing a variety of different symbols. The symbols may include any variety of graphical symbols, emblems, elements, or representations, including symbols that are associated with one or more themes (e.g., a LIGHTNING STRIKE theme) of the gaming terminal 710 or gaming system 700. The symbols on the reels 721-725 are arranged in an array or matrix, which in this embodiment is a 3×5 matrix of symbols. The reels 721-725 are varied (e.g., spun and stopped) to reveal combinations of symbols, which represent randomly selected outcomes of the wagering game 730, that are evaluated for winning combinations. Winning combinations of symbols landing, for example, on activated paylines (e.g., those paylines for which a wager has been received), cause awards to be paid in accordance with one or more pay tables (e.g., paytable 718) associated with the gaming system 700. The gaming system 700, gaming terminal 710, and wagering game 730 can each include any or all of the relevant features and options described above, in any combination. As such, for brevity and succinctness, these features will not be repeated at this juncture.

Figure 11:
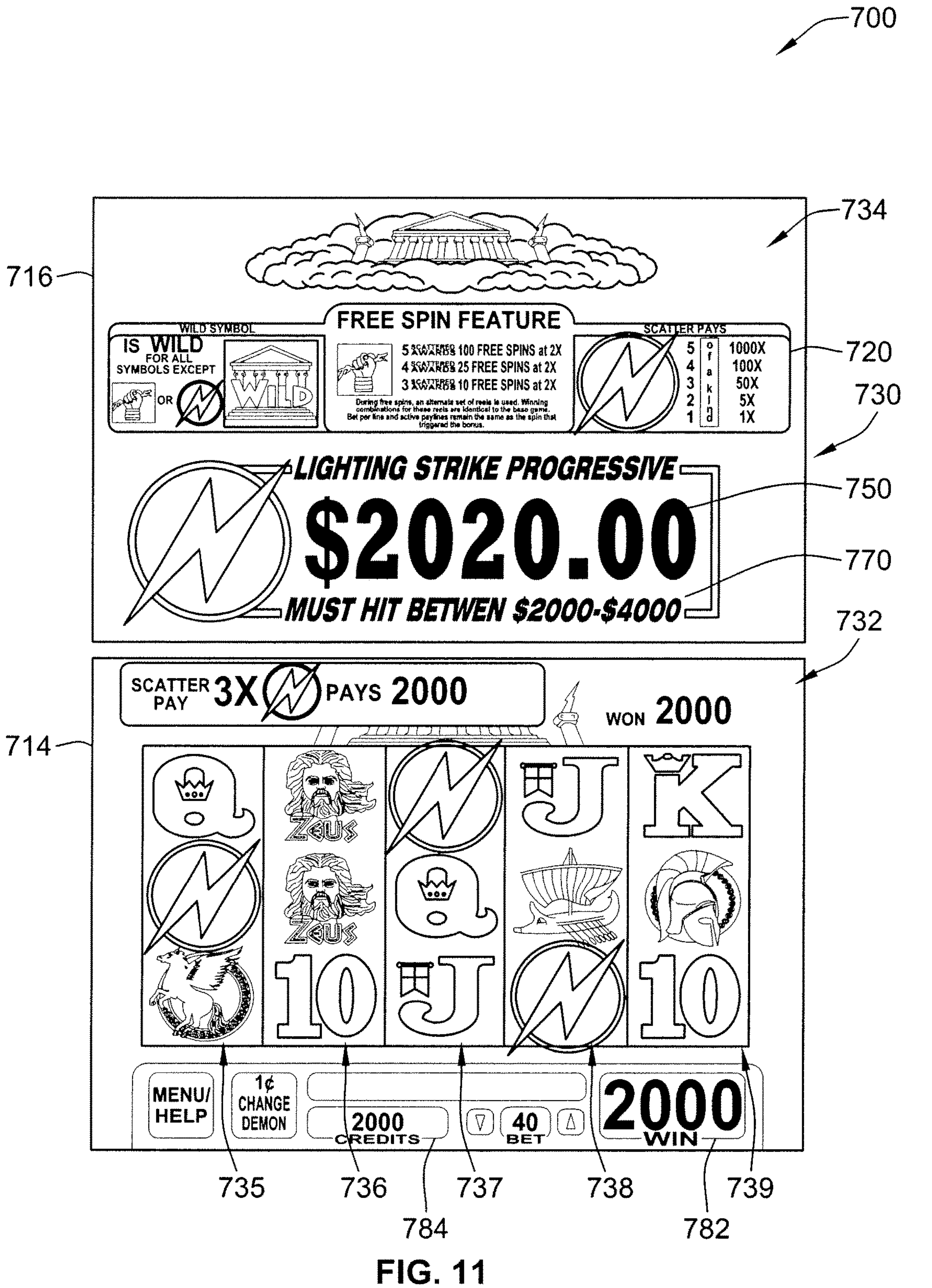
FIG. 11 is a screen shot of the basic-game screen of FIG. 6 and of a representative progressive-game screen in accordance with aspects of the present disclosure.

The screen shot of the second display 716 illustrates a second instance or portion (e.g., a LIGHTNING STRIKE progressive jackpot game) 734 of the wagering game 730. The progressive jackpot game 734 includes a progressive jackpot 750 with an incrementing progressive value (e.g., $2,000.00 in FIG. 10). The LIGHTNING STRIKE progressive jackpot game 734 presented in FIGS. 10 and 11 is a "threshold triggered" progressive game. That is, the progressive value for the progressive jackpot 750 is gradually increased until it meets or exceeds a trigger value, at which point the progressive jackpot value is awarded to the player. The progressive value of the progressive jackpot 550 is increased by an increment amount that corresponds to the value of an award conferred in the base game 732. In the embodiment of FIGS. 10 and 11, only certain base-game awards are added to the progressive value of the progressive jackpot game 734. In some embodiments, the trigger value is randomly selected from a range of trigger values 770 each time the progressive value of the progressive jackpot 750 is set to a reset value. In the illustrated embodiment, the trigger value range 770 for the progressive jackpot 750 is between $2000 and $4000. The reset value, in some embodiments, is equal to 1000-times the maximum available bet, and the progressive jackpot 750 must be awarded by 2000-times the maximum available bet.

The wagering game 730 of FIGS. 10 and 11 include a LIGHTNING STRIKE scatter pay feature. Symbol combinations are evaluated in the wagering game 730 in accord with various schemes, such as the nine different symbol-driven line pays indicated in the paytable 718 or the two different symbol-driven scatter pays indicated in the scatter pay table 720. Scatter pays, as indicated above, are evaluated without regard to symbol position or active paylines, and only require that such combination appears anywhere on the reels 735-739. By way of non-limiting example, the player is awarded: one-times (1×) the total current bet when one lightning bolt symbol 746 appears anywhere on the reels 735-739; five-times (5×) the total current bet when two lightning bolt symbols 746 appear anywhere on the reels 735-739; fifty-times (50×) the total current bet when three lightning bolt symbols 746 appear anywhere on the reels 735-739; one-hundred-times (100×) the total current bet when four lightning bolt symbols 746 appear anywhere on the reels 735-739; and one-thousand-times (1000×) the total current bet when five lightning bolt symbols 746 appear anywhere on the reels 735-739. The outcome of the base game 732 portrayed in FIG. 10, for example, includes a scatter-pay combination of three lightning bolt symbols 746; the player is awarded a base-game award of 2000 credits—fifty-times (50×) the total current bet of forty (40) credits. The resultant award may subsequently be displayed to the player on the primary display device 714 in the WIN meter 782 and added to the CREDITS meter 784, and is therefore available to the player for subsequent play of the wagering game 730.

In addition to awarding the player a base-game award in accordance with the foregoing scatter-pay scheme, every winning lightning-bolt-symbol based award is also added to the progressive value of the progressive jackpot 750. For example, FIG. 11 shows the progressive value of the progressive jackpot 750 being increased by an increment amount that corresponds to the value of the lightning-bolt-symbol based award conferred in the base game 532. The progressive value of the progressive jackpot 750 is increased by 2000 credits (or $20.00) from the previous progressive value of $2,000.00 (FIG. 10) to an incremented progressive value of $2,020.00 (FIG. 11). If the incremented progressive value of the progressive jackpot 750 is equal to or greater than the current trigger value, the incremented progressive value of the progressive jackpot 750 is conferred upon the player. In the illustrated example, the progressive jackpot 750 has an incremented progressive value of $2,020.00; if the current progressive trigger is $less than or equal to $2,020.00, the incremented progressive value is awarded to the player and, in some embodiments, the progressive jackpot 750 is reset to a reset value. Optionally, the progressive jackpot 750 is guaranteed to hit within a maximum bet multiplied by highest multiplier—e.g., ×1000 in FIG. 11. In addition, the progressive value of the progressive jackpot 750 can be incremented based on awards in the base game OR a bonus game (e.g., lightning-bolt-symbol based awards occurring during play of a free-spin bonus).

While many preferred embodiments and best modes for carrying out the present invention have been described in detail above, those familiar with the art to which this invention relates will recognize various alternative designs and embodiments for practicing the invention within the scope of the appended claims.

What is claimed is:

1. A gaming system for conducting a wagering game, the wagering game including a base game and one or more progressive jackpots, the gaming system comprising:

at least one processor;

an input device configured to receive a wager to play the wagering game;

a display configured to display outcomes of the wagering game; and at least one memory device storing a plurality of instructions which, when executed by the at least one processor, cause the at least one processor to operate with the display to:

determine whether at least one of the one or more progressive jackpots is active, the one or more progressive jackpots each being switchable between active and inactive states and each having a respective progressive value and a respective trigger value;

determine an outcome of the base game, the base game including a plurality of symbol-bearing reels, the base-game outcome being randomly determined from a plurality of base-game outcomes, the base-game outcome including symbols of the symbol-bearing reels arranged on the display;

determine if the symbols of the symbol-bearing reels arranged on the display in the base-game outcome have a base-game award associated therewith;

responsive to the at least one of the one or more progressive jackpots being active and the base-game outcome having a base-game award associated therewith, award the base-game award to the player and increment the respective progressive value of the active at least one progressive jackpot by an increment amount equal to at least the base-game award; and responsive to the incremented respective progressive value of the active at least one progressive jackpot being equal to or greater than the respective trigger value, award the incremented respective progressive value to the player.

2. The gaming system of claim 1, wherein the at least one memory device further stores one or more instructions to:

responsive to the at least one of the one or more progressive jackpots not being active and the base-game outcome having a base-game award associated therewith, award the base-game award to the player and end the base game.

3. The gaming system of claim 1, wherein the at least one memory device further stores one or more instructions to:

responsive to the at least one of the one or more progressive jackpots being active and the base-game outcome not having a base-game award associated therewith, end the base game without awarding to the player the base-game award or the at least one of the one or more progressive jackpots.

4. The gaming system of claim 1, wherein each of the respective trigger values of the one or more progressive jackpots is randomly selected from a respective range of trigger values.

5. The gaming system of claim 1, wherein the one or more progressive jackpots includes a plurality of progressive jackpots, each of the respective trigger values of each one of the progressive jackpots being randomly selected from a respective range of trigger values, each of the respective ranges of trigger values being different.

6. The gaming system of claim 1, wherein the increment amount is equal to the base-game award multiplied by a randomly determined multiplier.

7. The gaming system of claim 1, wherein the at least one memory device further stores one or more instructions to:

determine if a plurality of the one or more progressive jackpots is active; and responsive to the plurality of progressive jackpots being active and the base-game outcome having a base-game award associated therewith, award the base-game award to the player and increment the respective progressive values of all of the active plurality of progressive jackpots by the increment amount.

8. The gaming system of claim 7, wherein the at least one memory device further stores one or more instructions to:

determine if each of the incremented respective progressive values of the active plurality of progressive jackpots is equal to or greater than their respective trigger value; and award to the player all respective ones of the incremented respective progressive values equal to or greater than their respective trigger values.

9. The gaming system of claim 7, wherein the at least one memory device further stores one or more instructions to:

determine if each of the incremented respective progressive values of the active plurality of progressive jackpots is equal to or greater than the respective trigger value; and award to the player one or more, but not all, of the incremented respective progressive values equal to or greater than their respective trigger values.

10. The gaming system of claim 1, wherein the at least one memory device further stores one or more instructions to:

responsive to the incremented respective progressive value of the active at least one progressive jackpot being greater than the respective trigger value, determine a remainder amount equal to the incremented respective progressive value less the respective trigger value; and reset the respective progressive value of the active at least one progressive jackpot to a reset value plus the remainder amount.

11. The gaming system of claim 10, wherein the at least one memory device further stores one or more instructions to:

determine a new trigger value for the active at least one progressive jackpot; and responsive to the reset respective progressive value of the active at least one progressive jackpot being equal to or greater than the new trigger value, award the reset respective progressive value to the player.

12. The gaming system of claim 1, wherein the at least one memory device further stores one or more instructions to:

responsive to the base-game outcome having a base-game award associated therewith, determine if the base-game award is one of a plurality of selected base game awards, wherein the respective progressive value of the active at least one progressive jackpot is incremented by the increment amount only if the base-game award is one of the plurality of selected base game awards.

13. The gaming system of claim 1, wherein the one or more progressive jackpots are one of a wide area progressive (WAP), a local area progressive (LAP), a stand alone progressive (SAP), and a portal application.

14. A gaming system for conducting a wagering game, the gaming system comprising:

one or more input devices;

one or more display devices;

one or more processors; and one or more memory devices storing instructions which, when executed by at least one of the one or more processors, cause the gaming system to conduct operations related to the wagering game, the operations including:

receiving a wager to play the wagering game, the wagering game including a plurality of symbol-bearing reels;

determining an outcome of a first instance of the wagering game, the outcome being randomly determined from a plurality of wagering-game outcomes, the outcome including symbols of the symbol-bearing reels arranged on the one or more display devices;

determining if the symbols of the symbol-bearing reels arranged on the one or more display devices in the first-instance outcome have an award associated therewith;

determining whether one or more progressive jackpots associated with the wagering game are active, the one or more progressive jackpots each being switchable between active and inactive states and each having a respective incrementing progressive value and a respective trigger value selected from a respective range of trigger values;

responsive to the one or more progressive jackpots not being active and the first-instance outcome having an award associated therewith, award the award to the player and end the first instance of the wagering game;

responsive to the one or more progressive jackpots being active and the first-instance outcome not having an award associated therewith, end the first instance of the wagering game without awarding to the player the award or the one or more progressive jackpots;

responsive to the one or more progressive jackpots being active and the first-instance outcome having an award associated therewith, award the award to the player and increment the respective progressive value of the active one or more progressive jackpots by an increment amount corresponding to the award; and responsive to the incremented respective progressive value of at least one of the active one or more progressive jackpots being equal to or greater than the respective trigger value, award the at least one of the incremented respective progressive values to the player.

15. A computer-implemented method of conducting a wagering game on a gaming device, the method comprising:

receiving a wager via one or more input devices to play the wagering game, the wagering game including a plurality of symbol-bearing reels;

determining, via one or more processors, an outcome of a first instance of the wagering game, the outcome being randomly determined from a plurality of wagering-game outcomes;

displaying, via one or more display devices, the first-instance outcome, the outcome including symbols of the symbol-bearing reels arranged on the one or more display devices;

determining if the symbols of the symbol-bearing reels arranged on the one or more display devices in the first-instance outcome have an award associated therewith;

determining whether one or more progressive jackpots associated with the wagering game are active, the one or more progressive jackpots each being switchable between active and inactive states and each having a respective incrementing progressive value and a respective trigger value;

responsive to the one or more progressive jackpots being active and the first-instance outcome having an award associated therewith, awarding the award to the player and incrementing the respective progressive value of the active one or more progressive jackpots by an increment amount equal to at least the award; and responsive to the incremented respective progressive value of at least one of the active one or more progressive jackpots being equal to or greater than the respective trigger value, awarding the at least one of the incremented respective progressive values to the player.

16. The computer-implemented method of claim 15, further comprising, responsive to the one or more progressive jackpots not being active and the first-instance outcome having an award associated therewith, awarding the award to the player and ending the first instance of the wagering game.

17. The computer-implemented method of claim 15, further comprising, responsive to the one or more progressive jackpots being active and the first-instance outcome not having an award associated therewith, ending the first instance of the wagering game without awarding to the player the award or the one or more progressive jackpots.

18. The computer-implemented method of claim 15, further comprising randomly selecting the respective trigger value of each of the one or more progressive jackpots from a respective range of trigger values.

19. The computer-implemented method of claim 15, further comprising, responsive to a plurality of the one or more progressive jackpots being active and the first-instance outcome having an award associated therewith, awarding the award to the player and incrementing the respective progressive values of all of the active plurality of progressive jackpots by the increment amount.

20. The computer-implemented method of claim 19, further comprising:

determining if each of the incremented respective progressive values of the active plurality of progressive jackpots is equal to or greater than the respective trigger value; and awarding to the player one or more of the incremented respective progressive values equal to or greater than their respective trigger values.

21. The computer-implemented method of claim 15, further comprising:

responsive to the incremented respective progressive value of the active at least one progressive jackpot being greater than the respective trigger value, determining a remainder amount equal to the incremented respective progressive value less the respective trigger value;

resetting the respective progressive value of the active at least one progressive jackpot to a reset value plus the remainder amount;

determining a new trigger value for the active at least one progressive jackpot; and responsive to the reset respective progressive value of the active at least one progressive jackpot being equal to or greater than the new trigger value, awarding the reset respective progressive value to the player.

22. One or more non-transient computer-readable storage media including instructions, the instructions being configured to cause, upon execution by one or more controllers, the acts of:

determining an outcome of a first instance of the wagering game, the wagering game including a plurality of symbol-bearing reels, the outcome including symbols of the symbol-bearing reels arranged on one or more display devices;

determining if the symbols of the symbol-bearing reels arranged on the one or more display devices in the first-instance outcome have an award associated therewith;

determining whether one or more progressive jackpots associated with the wagering game are active, the one or more progressive jackpots each being switchable between active and inactive states and each having a respective incrementing progressive value and a respective trigger value;

responsive to the one or more progressive jackpots being active and the first-instance outcome having an award associated therewith, awarding the award to the player and incrementing the respective progressive value of the active one or more progressive jackpots by an increment amount equal to at least the award; and responsive to the incremented respective progressive value of at least one of the active one or more progressive jackpots being equal to or greater than the respective trigger value, awarding the at least one of the incremented respective progressive values to the player.

23. A gaming system for conducting a wagering game, the wagering game including a base game and a progressive jackpot, the gaming system comprising:

an input device configured to receive a wager to play the wagering game, the wagering game including a plurality of symbol-bearing reels;

a display configured to display outcomes of the wagering game; and a controller configured to:

determine whether the progressive jackpot is active, the progressive jackpot being switchable between active and inactive states and having an incrementing progressive value;

determine an outcome of the base game, the base-game outcome being randomly determined from a plurality of base-game outcomes, the outcome including symbols of the symbol-bearing reels arranged on the display;

determine if the symbols of the symbol-bearing reels arranged on the display in the base-game outcome have a base-game award associated therewith;

responsive to the progressive jackpot being active and the base-game outcome having a base-game award associated therewith, award the base-game award to the player and increment the progressive value of the active progressive jackpot by an increment amount equal to at least the base-game award; and responsive to a triggering event, award the incremented progressive value to the player.

24. The gaming system of claim 23, wherein the triggering event includes the incremented progressive value of the active progressive jackpot being equal to or greater than a trigger value associated with the active progressive jackpot.

25. The gaming system of claim 23, wherein the triggering event includes a number of random draws, wherein the number of random draws is based, at least in part, on an amount of the base-game award.

* * * * *